US009677031B2

(12) United States Patent
Cabanas et al.

(10) Patent No.: US 9,677,031 B2
(45) Date of Patent: Jun. 13, 2017

(54) CATALYZED NON-STAINING HIGH ALKALINE CIP CLEANER

(71) Applicant: Ecolab USA Inc., St. Paul, MN (US)

(72) Inventors: Jesus Cabanas, Inver Grove Heights, MN (US); Paul Frazer Schacht, Oakdale, MN (US); Brian Williams, Eagan, MN (US); Altony J. Miralles, Woodbury, MN (US); Court Colin, Castle Hill (AU); Caleb Power, St. Paul, MN (US)

(73) Assignee: Ecolab USA Inc., St. Paul, MN (US)

( * ) Notice: Subject to any disclaimer, the term of this patent is extended or adjusted under 35 U.S.C. 154(b) by 64 days.

(21) Appl. No.: 14/310,479

(22) Filed: Jun. 20, 2014

(65) Prior Publication Data

US 2015/0368592 A1 Dec. 24, 2015

(51) Int. Cl.

| | |
|---|---|
| ***B08B 9/00*** | (2006.01) |
| ***B08B 3/00*** | (2006.01) |
| ***C02F 5/08*** | (2006.01) |
| ***C23G 1/06*** | (2006.01) |
| ***C23G 1/28*** | (2006.01) |
| ***C11D 3/02*** | (2006.01) |
| ***C11D 3/00*** | (2006.01) |

(Continued)

(52) U.S. Cl.

CPC ............ *C11D 3/0073* (2013.01); *C11D 3/044* (2013.01); *C11D 3/046* (2013.01); *C11D 3/2086* (2013.01); *C11D 7/06* (2013.01); *C11D 7/10* (2013.01); *C11D 7/265* (2013.01); *C11D 11/0041* (2013.01)

(58) Field of Classification Search

None

See application file for complete search history.

(56) References Cited

U.S. PATENT DOCUMENTS

| | | |
|---|---|---|
| 3,443,577 A | 5/1969 | Nilsson |
| 3,951,681 A | 4/1976 | Shoemaker et al. |

(Continued)

FOREIGN PATENT DOCUMENTS

| | | |
|---|---|---|
| CA | 1134726 | 11/1982 |
| CN | 101760072 | 6/2010 |

(Continued)

OTHER PUBLICATIONS

Brânzoi, Viorel, et al., "Corrosion Protection of Industrial Cooling Water Systems by Using New Organic Polymers as Inhibitors", Revue Roumaine de Chimie, 2008, 53(6), pp. 459-469. Dec. 31, 2008.

(Continued)

*Primary Examiner* — Eric Golightly
*Assistant Examiner* — Arlyn I Rivera-Cordero
(74) *Attorney, Agent, or Firm* — McKee, Voorhees & Sease, PLC

(57) ABSTRACT

A catalyzed highly alkaline cleaning composition for cleaning stainless steel and other surfaces, namely those treated in clean-in-place processes, is disclosed. The composition comprises gluconic acid or salt thereof (e.g. gluconate) to serve as a corrosion and stain inhibitor for the high alkalinity compositions. The composition retains the cleaning and corrosion prevention properties of conventional clean-in-place solutions while being less expensive to produce.

20 Claims, 13 Drawing Sheets

(51) Int. Cl.

| | |
|---|---|
| ***C11D 3/04*** | (2006.01) |
| ***C11D 3/20*** | (2006.01) |
| ***C11D 7/06*** | (2006.01) |
| ***C11D 7/10*** | (2006.01) |
| ***C11D 7/26*** | (2006.01) |
| ***C11D 11/00*** | (2006.01) |

(56) References Cited

U.S. PATENT DOCUMENTS

| | | | |
|---|---|---|---|
| 4,088,678 | A | 5/1978 | Matt et al. |
| 4,338,209 | A | 7/1982 | Manabe et al. |
| 4,349,457 | A | 9/1982 | Orillion |
| 4,402,747 | A | 9/1983 | Bird et al. |
| 4,416,701 | A | 11/1983 | Huster et al. |
| 4,477,290 | A | 10/1984 | Carroll et al. |
| 4,512,552 | A | 4/1985 | Katayama et al. |
| 4,557,966 | A | 12/1985 | Weil |
| 4,606,840 | A * | 8/1986 | Gautier .................. C09D 9/005 134/38 |
| 4,606,890 | A | 8/1986 | Fisk |
| 4,784,779 | A | 11/1988 | Dadgar |
| 4,963,290 | A | 10/1990 | Bressan et al. |
| 4,973,448 | A | 11/1990 | Carlson et al. |
| 5,018,577 | A | 5/1991 | Pardue et al. |
| 5,023,000 | A | 6/1991 | Kneller et al. |
| 5,061,395 | A | 10/1991 | Meng |
| 5,085,794 | A | 2/1992 | Kneller et al. |
| 5,209,869 | A | 5/1993 | Miksic et al. |
| 5,303,743 | A | 4/1994 | Vincent |
| 5,320,778 | A | 6/1994 | Miksic et al. |
| 5,344,589 | A | 9/1994 | Miksic et al. |
| 5,422,187 | A | 6/1995 | Miksic et al. |
| 5,606,105 | A | 2/1997 | Davis et al. |
| 6,033,599 | A | 3/2000 | Lozano et al. |
| 6,572,789 | B1 | 6/2003 | Yang et al. |
| 7,828,908 | B1 | 11/2010 | Miralles |
| 7,887,641 | B2 | 2/2011 | Man et al. |
| 8,025,840 | B2 | 9/2011 | Crovetto et al. |
| 8,114,222 | B2 | 2/2012 | Fernholz et al. |
| 8,205,980 | B2 | 6/2012 | Notoya et al. |
| 8,338,350 | B2 | 12/2012 | Inaoka |
| 2008/0312118 | A1 * | 12/2008 | Futterer ................. C11D 3/361 510/180 |
| 2009/0203567 | A1 | 8/2009 | Fernholz et al. |
| 2009/0325841 | A1 | 12/2009 | Erickson et al. |
| 2010/0292126 | A1 | 11/2010 | Smith et al. |
| 2011/0257071 | A1 | 10/2011 | Miralles |
| 2012/0108489 | A1 | 5/2012 | Miralles |
| 2013/0062568 | A1 | 3/2013 | Miralles |

FOREIGN PATENT DOCUMENTS

| | | |
|---|---|---|
| EP | 0614860 | 9/1994 |
| EP | 0652305 | 5/1995 |

OTHER PUBLICATIONS

Cortec, PK Mathew, "Corrosion Protection during Storage and Transit using Vapor Phase Corrosion Inhibitors". May 6, 2014.
Vasanth, K.L., et al., "Vapor Phase Corrosion Inhibitors for Navy Applications", National Association of Corrosion Engineers (NACE) paper #179. Dec. 31, 1997.
CN 101760072, Blue Star Cleaning Engineering—English. Date: Jun. 30, 2010.
Korean International Property Office, "International Search Report and Written Opinion", Issued in Connection to International Application No. PCT/US2015/036723, 14 pages, mailed Sep. 24, 2015.

* cited by examiner

CATALYZED NON-STAINING HIGH ALKALINE CIP CLEANER

FIELD OF THE INVENTION

The present invention relates to catalyzed highly alkaline cleaning compositions for cleaning metal and other surfaces, particularly clean-in-place (CIP) applications which commonly clean stainless steel surfaces. The compositions include a corrosion inhibitor and catalyst to provide surface cleaning and protection from caustic and peroxide staining and corrosion in both liquid phase and vapor phases. Methods of using the compositions are particularly suited for cleaning equipment such as heat exchangers, evaporators, tanks and other industrial equipment using CIP procedures.

BACKGROUND OF THE INVENTION

Steel is the generic name for a group of ferrous metals, composed principally of iron, which have considerable durability and versatility. It is used as a base material for many commercial applications, including for example, major appliances and industrial equipment. One of the problems which arise in the use of steel, including stainless steel, is its corrosion and staining, either by the atmosphere or by the environment in which it is used. Corrosion refers to destruction, degradation or deterioration of the metal due to reactions of the material and its environment. The rate of corrosion may vary, depending on the surrounding conditions and also the composition of the steel. Stainless steel, for example, is more resistant to corrosion than plain carbon and other steels. This resistance is due to the addition of chromium to alloys of iron and carbon. Although stainless steel has appreciable resistance to corrosion, it will still corrode in certain circumstances and attempts have been made to prevent or reduce this corrosion.

Corrosion inhibitors can be used to inhibit the corrosion of ferrous metals and provided in cleaning compositions. Many metallic ion corrosion inhibitors have been used alone or in combination in various chemical treatment formulations. Some inhibitors, however, have been found to be toxic and/or detrimental to the environment. Inorganic phosphates such as orthophosphate and pyrophosphate have been widely used corrosion inhibitors. However, the inorganic phosphates have been found to contribute to scale formation (e.g., calcium phosphate, iron phosphate and zinc phosphate salts). Some organic phosphonates (e.g. 2-phosphono-butane-1,2,4-tricarboxylic acid (PBTC), 1-hydroxyethylidene-1,1-diphosphonic acid (HEDP), and aminotrimethylene-phosphonic acid (AMP)) have been used as corrosion inhibitors; however, the effectiveness has not been optimized. Some hydroxycarboxylic acids (e.g. gluconic acid) have also been used as corrosion inhibitors in aqueous applications such as cleaning cooling towers; however, there are microbiological growth control concerns and performance concerns when used in certain conditions, such as high alkalinity, temperature and/or oxidizing environments.

There is a need for corrosion inhibition using highly alkaline cleaning compositions, such as those commonly used in clean-in-place (CIP) applications. CIP applications are required in many industrial applications, such as the manufacture of foods and beverages, where hard surfaces commonly become contaminated with soils such as carbohydrate, proteinaceous, and hardness soils, food oil soils and other soils. Food and beverage soils are particularly tenacious when they are heated during processing (e.g. in dairy plants, dairy products are heated on a pasteurizer such as a high temperature short time pasteurizer or ultra-high temperature pasteurizer). Also, many food and beverage products are concentrated or created as a result of evaporation. When that surface is a heat exchange surface, the soil becomes thermally degraded rendering it even more difficult to remove. Over time, the layer of soil increases in thickness as more food or beverage product is passed over the heat exchange surface. The layer of soil acts as an insulator between the heat and the product being heated, thereby reducing the efficiency of the heat exchange surface and requiring more energy to create the same effect if the heat exchange surface were clean. When the heat exchange surface is an evaporator, the difference between a clean heat exchange surface and a soiled heat exchange surface can mean the difference in millions of dollars in energy costs for an evaporator plant. With the cost of energy increasing significantly, as well as an increased awareness of protecting the environment by preserving natural resources, there remains a need for cleaning programs that can clean heat exchange surfaces and create an efficient transfer a heat.

Surfaces cleaned in a CIP process are most often stainless steel surfaces. The cleaning requires a complete or partial shutdown of the equipment being cleaned, which results in lost production time. Many times, the equipment is not thoroughly cleaned, due to the large downtime needed. Therefore, what is needed is an improved method for cleaning this equipment, using the CIP process, which uses an alkaline cleaning composition that will prevent corrosion and damage to the stainless steel surfaces treated in order to thoroughly remove the soils. It is against this background that the present invention has been made.

It is an object of this invention to provide aqueous, highly alkaline cleaning compositions that are noncorrosive to stainless steel and other metal surfaces due to addition of a corrosion inhibitor such as gluconic acid, sodium gluconate and/or salts thereof.

It is a further object of this invention to provide such corrosion inhibited highly alkaline cleaning compositions that do not stain the treated surfaces as a result of the formulation using a corrosion inhibitor.

Accordingly, it is an object of this invention to provide non-staining, corrosion inhibited highly alkaline cleaning compositions effective in both liquid and vapor phases for treatment of metal surfaces, such as CIP processes.

Yet another object is to provide a liquid phase and vapor phase alkaline cleaning composition having corrosion and stain inhibition suitable for use with stainless steel.

Other objects, aspects and advantages of this invention will be apparent to one skilled in the art in view of the following disclosure, the drawings, and the appended claims. These and other embodiments will be apparent to these of skill in the art and others in view of the following detailed description. It should be understood, however, that this summary and the detailed description illustrate only some examples, and are not intended to be limiting to the invention as claimed.

SUMMARY OF THE INVENTION

The present invention employs the use of gluconic acid/sodium gluconate or salts thereof as a corrosion and stain inhibitor for use in catalyzed and/or highly alkaline cleaning compositions. Applicants have found, surprisingly that the gluconic acid as a corrosion inhibitor in a highly alkaline and oxidizing environment prevents corrosion and staining which is customarily caused by catalyzed cleaning compositions (e.g. decomposing hydrogen peroxide or other oxidants). According to the invention, the catalyzed highly alkaline composition can be used in combination with an oxidizing composition while providing both liquid phase and vapor phase corrosion and staining inhibition for metal surfaces, such as stainless steel.

In an embodiment, corrosion and stain inhibited compositions are disclosed as comprising an alkali metal hydroxide alkalinity source, a corrosion inhibiting amount of gluconic acid or a salt thereof, a catalyst capable of decomposing an active oxygen source, and water. In an aspect, the pH of a use solution of the composition is at least about 12.

In an embodiment, methods of CIP cleaning providing liquid and vapor phase corrosion and stain inhibition are disclosed as comprising providing a concentrate alkaline cleaning composition to soils in industrial equipment, wherein the alkaline cleaning composition comprises an alkali metal hydroxide alkalinity source, a corrosion inhibiting amount of gluconic acid or a salt thereof, a catalyst capable of decomposing an active oxygen source, and water; allowing the alkaline cleaning composition to remain on the soil for a period of time sufficient to facilitate soil removal; circulating the alkaline cleaning composition through the equipment; and then optionally rinsing the equipment.

In an additional embodiment, methods of inhibiting liquid and vapor phase corrosion and staining while cleaning soils from industrial equipment using a CIP process under highly alkaline and oxidizing conditions comprise: providing an alkaline cleaning composition to soils in industrial equipment, wherein the alkaline cleaning composition comprises an alkali metal hydroxide alkalinity source, a corrosion inhibiting amount of gluconic acid or a salt thereof, a catalyst capable of decomposing an active oxygen source, and water, wherein a use solution of the alkaline cleaning composition has a pH of at least about 12; providing an oxidizing composition to the soils in the industrial equipment, wherein the oxidizing composition comprises hydrogen peroxide and/or a peroxycarboxylic acid; allowing the alkaline cleaning composition and oxidizing composition to remain on the soil for a period of time sufficient to facilitate soil removal; circulating the alkaline cleaning composition and oxidizing composition through the equipment; and then optionally rinsing the equipment.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
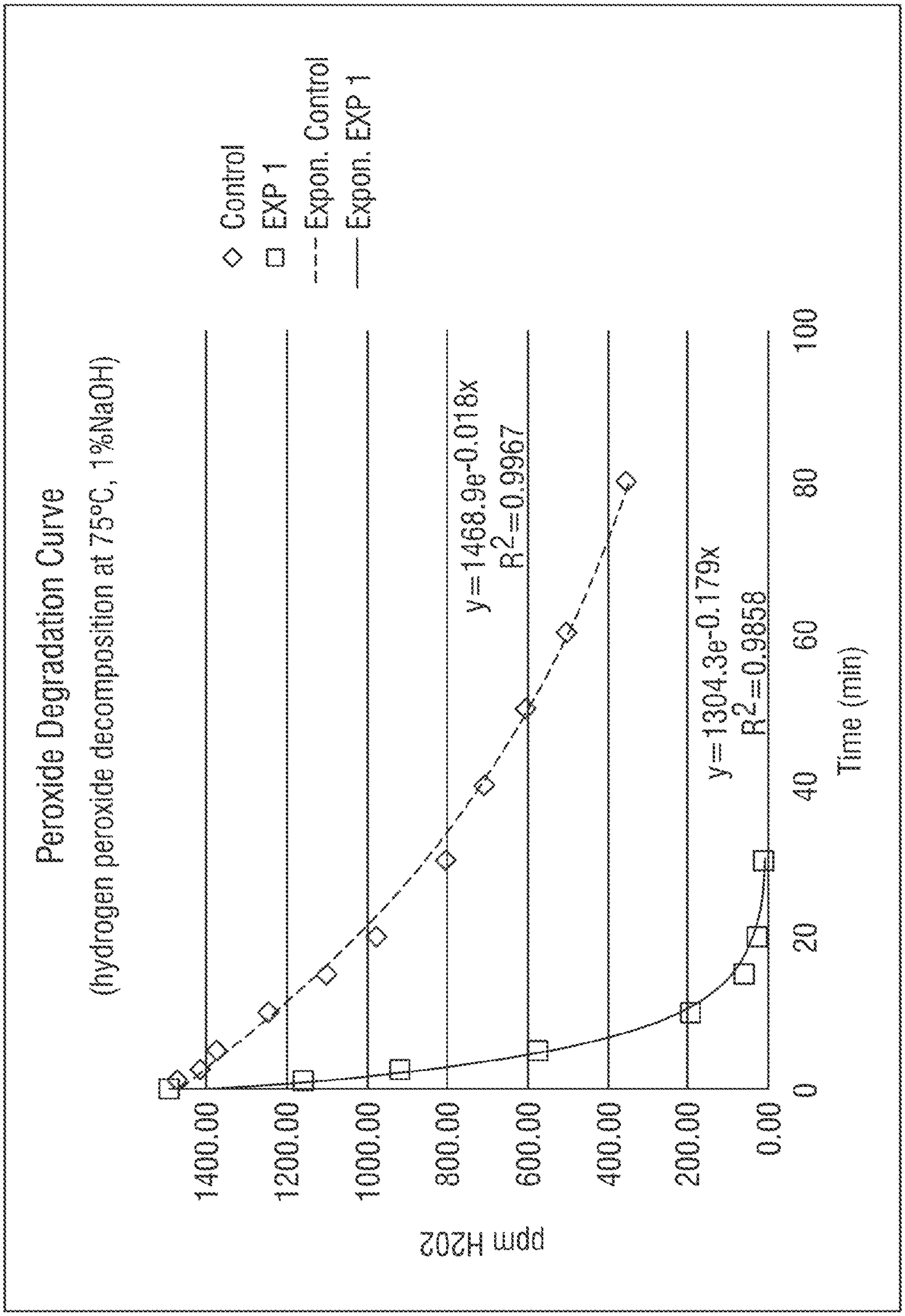
FIG. 1 shows a peroxide degradation curve comparing hydrogen peroxide decomposition in a highly alkaline control and test formulation according to an embodiment of the invention, wherein increased hydrogen peroxide decomposition results in increased bubbling of a cleaning composition and therefore cleaning performance.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION

The present invention relates to compositions and methods of use for preventing alkalinity and oxidant-based staining and corrosion on metal surfaces. Beneficially, the compositions and methods of use thereof provide such anticorrosion and anti-staining efficacy in both liquid phase and vapor phases. Methods of using the compositions are particularly suited for cleaning equipment such as heat exchangers, evaporators, tanks and other industrial equipment using CIP procedures. So that the invention maybe more readily understood, certain terms are first defined and certain test methods are described.

The embodiments of this invention are not limited to particular non-staining and non-corroding compositions and methods of use thereof, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

"Cleaning" means to perform or aid in soil removal, bleaching, microbial population reduction, rinsing, or combination thereof.

The term "hard surface" refers to a solid, substantially non-flexible surface such as a counter top, tile, floor, wall, panel, window, plumbing fixture, kitchen and bathroom furniture, appliance, engine, circuit board, and dish. Hard surfaces may include for example, health care surfaces and food processing surfaces.

The term "stainless steel," as used herein, refers to the classification of carbon steels containing at least about 5 weight percent, usually about 5 to about 40 weight percent, and normally about 10 to about 25 weight percent chromium. They may also contain other alloying elements such as nickel, cerium, aluminum, titanium, copper, or other elements. Stainless steels are usually classified in three different categories—austenitic, ferritic, and martensitic steels—which have in common the fact that they contain significant amounts of chromium and resist corrosion and oxidation to a greater extent than do ordinary carbon steels and most alloy steels. Additional description of the classifications (including SAE steel grades used for grading in the U.S. for stainless steel) and compositions of stainless steel, including those stainless steel having higher corrosion-resistant properties which are also suitable for use with the present application, is disclosed for example in U.S. Patent Publication No. 2013/0062568, the entire disclosure of which is herein incorporated by reference.

As used herein, "weight percent," "wt-%," "percent by weight," "% by weight," and variations thereof refer to the concentration of a substance as the weight of that substance divided by the total weight of the composition and multiplied by 100. It is understood that, as used here, "percent," "%," and the like are intended to be synonymous with "weight percent," "wt-%," etc.

The methods, systems, and compositions of the present invention may comprise, consist essentially of, or consist of the components and ingredients of the present invention as well as other ingredients described herein. As used herein, "consisting essentially of" means that the methods, systems, and compositions may include additional steps, components or ingredients, but only if the additional steps, components or ingredients do not materially alter the basic and novel characteristics of the claimed methods, systems, and compositions.

Non-Staining Compositions and Methods

According to the invention, a concentrated alkaline cleaning composition providing non-staining and non-corrosive cleaning efficacy in both liquid phases and vapor phases is provided. The composition will find use in any cleaning situation where highly alkaline and/or oxidative cleaning compositions are employed and in need of reduced or eliminated staining and corrosion, including, but not limited to, applications to stainless steel surfaces.

Compositions

Exemplary ranges of the non-staining, non-corrosive alkaline cleaning compositions according to the invention are shown in Table 1 in weight percentage of the concentrated liquid formulations.

TABLE 1

| Component | Weight percent | Weight percent | Weight percent |
|---|---|---|---|
| Alkalinity source | 50-99 | 80-99 | 75-95 |
| Corrosion inhibitor (e.g. gluconic acid/sodium gluconate) | 0.1-50 | 1-25 | 5-10 |
| Catalyst (e.g. iron sulfate) | 0.001-1 | 0.1-1 | 0.25-0.5 |
| Additional Functional Ingredients | 0-50 | 0-40 | 0-25 |

The present compositions include concentrate compositions and use compositions. The concentrate compositions disclosed in Table 1 are suitable for use as one or more part premix compositions. In an aspect, the concentrate composition is provided as a single concentrate composition as set forth in Table 1. In another aspect, a concentrated premix formulation may be provided in a two part composition. For example, in an aspect, the concentrated composition set forth in Table 1 is obtained with use of a premix composition and a commodity alkalinity source (e.g. caustic). Additional embodiments of concentrated premixes may be employed (such as two or more part premixes). In an aspect of the invention a suitable premix may employ the catalyst and water for solubilizing the catalyst along with the corrosion inhibitor. In addition, the premix may further employ a small amount of alkalinity source (to be combined thereafter with the commodity alkalinity source) and additional functional ingredients, such as for example surfactant(s).

The concentrate compositions are diluted, for example with water, to form a use composition. In an embodiment, a concentrate composition can be diluted to a use solution before application. For reasons of economics, the concentrate can be marketed and an end user can dilute the concentrate with water or an aqueous diluent to a use solution. A use solution may be prepared from the concentrate by diluting the concentrate with water at a dilution ratio that provides a use solution having desired detersive properties. The water that is used to dilute the concentrate to form the use composition can be referred to as water of dilution or a diluent, and can vary from one location to another. Accordingly, one skilled in the art will employ the required amount of diluent (e.g. water) based upon the amounts listed above for concentrate compositions and the required dilution factors to obtain the desired use solution.

In an aspect of the invention, a use solution of the cleaning composition preferably has between about 2000 ppm alkalinity to about 4 wt-% alkalinity depending upon the cleaning application and the need for alkaline actives. In other aspects, the use composition may include at least about 500 ppm alkalinity, at least about 1000 ppm alkalinity, or at least about 2000 ppm alkalinity. In other aspects of the invention, a use solution of the cleaning composition has between about 2000 ppm alkalinity to about 4 wt-% alkalinity, between about 100 ppm to about 5000 ppm corrosion inhibitor, and between about 0.5 ppm to about 25 ppm catalyst. In addition, without being limited according to the invention, all ranges recited are inclusive of the numbers defining the range and include each integer within the defined range.

Catalyst

According to the invention, a catalyst is provided to increase the rate at which hydrogen peroxide (e.g. oxidizer) degrades to provide enhanced cleaning efficacy. According to the invention, suitable catalysts include metal or halogen ions (e.g., Fe or Mo ions, or halogens such as iodine). According to additional aspects of the invention, suitable catalysts include salts of the metal or halogen ions.

In a preferred embodiment, the catalyst is an iron metal and/or iron metal salt, in any of its different oxidation states, such as for example iron sulfate. It is unexpected according to the invention to employ an iron metal and/or iron metal salt within an alkaline cleaning composition without the causing of rusting or other corrosion on metal treated surfaces or precipitating under alkaline environments.

In additional embodiments, the metal ions (in varying oxidation states) can include for example, magnesium, manganese and its oxides and hydroxides, copper, zinc, and mixtures thereof. In some embodiments of the invention, the magnesium source includes magnesium oxide, magnesium hydroxide, magnesium sulfate, magnesium chloride, and mixtures thereof. In further embodiments of the invention, the copper can include, copper oxide, copper hydroxide, copper acetate, copper carbonate, copper sulfate, copper chloride, and mixtures thereof. In still further embodiments of the invention, zinc can include, zinc oxide, zinc hydroxide, zinc sulfate, zinc chloride, zinc acetate, zinc carbonate and mixtures thereof.

The catalyst may be provided in amounts from about 0.001-1 wt-% of the alkaline cleaning composition. In certain embodiments, the catalyst may comprise from about 0.01-1 wt-% of the alkaline cleaning composition, about 0.1-1 wt-% of the alkaline cleaning composition, or about 0.25-0.5 wt-% of the alkaline cleaning composition. In addition, without being limited according to the invention, all ranges recited are inclusive of the numbers defining the range and include each integer within the defined range.

Corrosion Inhibitors—Gluconic Acid and/or Salts Thereof

According to the invention, a corrosion inhibitor(s) is provided to protect against corrosion of ferrous metal surfaces, including for example steel and stainless steel, which can be exacerbated in highly alkaline compositions, including those employing catalysts. According to the invention, a gluconic acid or other polyhydroxy carboxylic acid (or hydroxycarboxylic acid) or salts thereof is employed as a corrosion inhibitor in the highly alkaline cleaning composition. In some aspects a combination of gluconic acid and other polyhydroxy carboxylic acid (or hydroxycarboxylic acid) or salts thereof are employed as a corrosion inhibitor.

In an aspect, gluconic acid and glucaric acid are suitable for use as a corrosion inhibitor package for the compositions according to the invention. Polyhydroxy carboxylic acids or hydroxycarboxylic acids useful as corrosion inhibitors preferably include those having 10 or fewer carbon atoms, or from 4 to 10 carbon atoms, with similar location of the carbon atoms and similar polyol grouping. These may include for example, glycolic acid, citric acid, malic acid, tartaric acid, lactic acid, tartronic acid, glutaric acid, adipic acid and/or succinic acid.

In an aspect, the corrosion inhibitor is soluble in water. Preferably, the corrosion inhibitor is non- or low-foaming.

In a preferred aspect, gluconic acid or salts thereof are employed as the corrosion inhibitor. In an additional aspect, glucaric acid or salts thereof are employed as the corrosion inhibitor. In an aspect, gluconic acid and glucaric acid are suitable for use as a corrosion inhibitor package for the compositions according to the invention. Gluconic acid/sodium gluconate is a mild organic acid formed by the oxidation of glucose whereby the physiological d-form is produced. It is also called maltonic acid, and dextronic acid. It has the molecular formula $C_6H_{12}O_7$ and condensed structural formula $HOCH_2(CHOH)_4COOH$. It is one of the 16 stereoisomers of 2,3,4,5,6-pentahydroxyhexanoic acid. In aqueous solution at neutral pH, gluconic acid forms the gluconate ion and exists in equilibrium with the cyclic ester glucono delta lactone. Gluconic acid, gluconate salts, and gluconate esters occur widely in nature because such species arise from the oxidation of glucose.

The corrosion inhibitor(s) may be provided in amounts from about 0.1-50 wt-% of the alkaline cleaning composition. In certain embodiments, the corrosion inhibitor(s) may comprise from about 0.1-25 wt-% of the alkaline cleaning composition, about 1-25 wt-% of the alkaline cleaning composition, or about 1-10 wt-% of the alkaline cleaning composition. In addition, without being limited according to the invention, all ranges recited are inclusive of the numbers defining the range and include each integer within the defined range.

Alkalinity Source

The compositions according to the invention include a source of alkalinity. Any of a variety of sources of alkalinity suitable for providing a highly alkaline pH of the cleaning composition described herein can be included or employed.

Suitable sources of alkalinity include hydroxide salt, phosphate salt, carbonate salt, borate salt, silicate salt, phosphonate salt, amine, mixtures thereof, of the like. Suitable sources of alkalinity include alkali metal hydroxide, alkali metal phosphate, alkali metal carbonate, alkali metal borate, alkali metal silicate, alkali metal phosphonate, amine, mixtures thereof, of the like. For example, the source of alkalinity can be an alkali metal hydroxide, such as sodium hydroxide or potassium hydroxide, mixtures thereof, of the like. For example, suitable sources of alkalinity include non-caustic alkalinity such as alkali metal phosphate, alkali metal carbonate, alkali metal borate, alkali metal silicate, alkali metal phosphonate, amine, alkanol amines, such as monoethanolamine and the like, mixtures thereof, of the like.

In a preferred aspect, the alkalinity source is an alkali metal hydroxide. Preferably, the alkali metal hydroxide is sodium hydroxide (e.g. caustic). Examples of suitable alkali metal hydroxides include sodium hydroxide, potassium hydroxide, and lithium hydroxide. The alkali metal hydroxides may be added to the composition in any form known in the art, including as solid beads, dissolved in an aqueous solution, or a combination thereof. Alkali metal hydroxides are commercially available as a solid in the form of prilled solids or beads having a mix of particle sizes ranging from about 12-100 U.S. mesh, or as an aqueous solution, as for example, as a 45% and a 50% by weight solution.

In other aspects, the alkalinity source may further include alkali metal salts, acid salts (e.g., weak acid salts), inorganic alkalinity sources, and the like. Some examples of alkali metal salts include alkali metal carbonate, alkali metal silicate, alkali metal phosphate, alkali metal phosphonate, alkali metal sulfate, alkali metal borate, or the like, and mixtures thereof. Suitable alkali metal carbonates include sodium or potassium carbonate, sodium or potassium bicarbonate, sodium or potassium sesquicarbonate, mixtures thereof, and the like; such as sodium carbonate, potassium carbonate, or mixtures thereof. Suitable inorganic alkalinity sources include alkali metal hydroxide, alkali metal silicate, or the like. Examples of useful alkaline metal silicates include sodium or potassium silicate (for example, with a $M_2O:SiO_2$ ratio of 1:2.4 to 5:1, M representing an alkali metal) or sodium or potassium metasilicate.

The alkalinity source may be provided in amounts from about 50-99 wt-% of the concentrated alkaline cleaning composition. In certain embodiments, the alkalinity source may comprise from about 80-99 wt-% of the alkaline cleaning composition, or about 75-95 wt-% of the alkaline cleaning composition. In addition, without being limited according to the invention, all ranges recited are inclusive of the numbers defining the range and include each integer within the defined range.

In an aspect, the pH of a use solution of the alkaline cleaning composition is at least about 10, preferably at least about 12. In certain embodiments, the use solution compositions can be at, or the methods can employ, an alkaline pH of about 12 to about 14, or about 13 to about 14 providing high alkaline applications of use.

Water

The compositions according to the invention include water as a solvent for the concentrated compositions (and/or premix compositions). Any of a variety of sources of water can be employed, wherein a softened water source is preferred.

Water may be provided in amounts from about 0.1-25 wt-% of the concentrated alkaline cleaning composition. In certain embodiments, water may comprise from about 0.1-10 wt-% of the alkaline cleaning composition, or about 1-5 wt-% of the alkaline cleaning composition. In addition, without being limited according to the invention, all ranges recited are inclusive of the numbers defining the range and include each integer within the defined range.

Additional Functional Ingredients

The components of the alkaline cleaning composition can further be combined with various functional components suitable for use in CIP applications. In some embodiments, the cleaning composition including the alkalinity source, corrosion inhibitor, catalyst and water make up a large amount, or even substantially all of the total weight of the cleaning composition. For example, in some embodiments few or no additional functional ingredients are disposed therein. In other embodiments, additional functional ingredients may be included in the compositions. The functional ingredients provide desired properties and functionalities to the compositions. For the purpose of this application, the term "functional ingredient" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional ingredients may be used. For example, many of the functional materials discussed below relate to materials used in CIP cleaning; however, other embodiments may include functional ingredients for use in other applications.

In certain embodiments, the compositions may include surfactants, defoaming agents, anti-redeposition agents, chelants, bleaching agents, solubility modifiers, dispersants, additional metal protecting agents, stabilizing agents, fragrances and/or dyes, rheology modifiers or thickeners, hydrotropes or couplers, buffers, solvents and the like.

Surfactants

In some embodiments, the compositions of the present invention include a surfactant. Surfactants suitable for use with the compositions of the present invention include, but are not limited to, nonionic surfactants, anionic surfactants, and zwitterionic surfactants. Preferably, any surfactants employed are low-foaming, non-foaming, or defoaming surfactants suitable for CIP applications. In a preferred aspect, a nonionic surfactant is employed as a defoaming or non-foaming surfactant. Further description of surfactants is set forth in "Surface Active Agents and Detergents" (Vol. I and II by Schwartz, Perry and Berch), which is herein incorporated by reference in its entirety.

Useful nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties. Useful nonionic surfactants include:

1. Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available under the trade names Pluronic® and Tetronic® manufactured by BASF Corp. Pluronic® compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from about 1,000 to about 4,000. Ethylene oxide is then added to sandwich this hydrophobe between hydrophilic groups, controlled by length to constitute from about 10% by weight to about 80% by weight of the final molecule. Tetronic® compounds are tetra-flinctional block copolymers derived from the sequential addition of propylene oxide and ethylene oxide to ethylenediamine. The molecular weight of the propylene oxide hydrotype ranges from about 500 to about 7,000; and, the hydrophile, ethylene oxide, is added to constitute from about 10% by weight to about 80% by weight of the molecule.

2. Condensation products of one mole of alkyl phenol wherein the alkyl chain, of straight chain or branched chain configuration, or of single or dual alkyl constituent, contains from about 8 to about 18 carbon atoms with from about 3 to about 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Rhone-Poulenc and Triton® manufactured by Union Carbide.

3. Condensation products of one mole of a saturated or unsaturated, straight or branched chain alcohol having from about 6 to about 24 carbon atoms with from about 3 to about 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade names Neodol™ manufactured by Shell Chemical Co. and Alfonic™ manufactured by Vista Chemical Co.

4. Condensation products of one mole of saturated or unsaturated, straight or branched chain carboxylic acid having from about 8 to about 18 carbon atoms with from about 6 to about 50 moles of ethylene oxide. The acid moiety can consist of mixtures of acids in the above defined carbon atoms range or it can consist of an acid having a specific number of carbon atoms within the range. Examples of commercial compounds of this chemistry are available on the market under the trade names Nopalcol™ manufactured by Henkel Corporation and Lipopeg™ manufactured by Lipo Chemicals, Inc.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application in this invention for specialized embodiments, particularly indirect food additive applications. All of these ester moieties have one or more reactive hydrogen sites on their molecule which can undergo further acylation or ethylene oxide (alkoxide) addition to control the hydrophilicity of these substances. Care must be exercised when adding these fatty ester or acylated carbohydrates to compositions of the present invention containing amylase and/or lipase enzymes because of potential incompatibility.

Examples of nonionic low foaming surfactants include:

5. Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from about 1,000 to about 3,100 with the central hydrophile including 10% by weight to about 80% by weight of the final molecule. These reverse Pluronics™ are manufactured by BASF Corporation under the trade name Pluronic™ R surfactants. Likewise, the Tetronic™ R surfactants are produced by BASF Corporation by the sequential addition of ethylene oxide and propylene oxide to ethylenediamine. The hydrophobic portion of the molecule weighs from about 2,100 to about 6,700 with the central hydrophile including 10% by weight to 80% by weight of the final molecule.

6. Compounds from groups (1), (2), (3) and (4) which are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to about 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

Additional examples of effective low foaming nonionics include:

7. The alkylphenoxypolyethoxyalkanols of U.S. Pat. No. 2,903,486 issued Sep. 8, 1959 to Brown et al. and represented by the formula

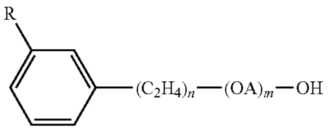

in which R is an alkyl group of 8 to 9 carbon atoms, A is an alkylene chain of 3 to 4 carbon atoms, n is an integer of 7 to 16, and m is an integer of 1 to 10.

The polyalkylene glycol condensates of U.S. Pat. No. 3,048,548 issued Aug. 7, 1962 to Martin et al. having alternating hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

The defoaming nonionic surfactants disclosed in U.S. Pat. No. 3,382,178 issued May 7, 1968 to Lissant et al. having the general formula $Z[(OR)_nOH]_z$ wherein Z is alkoxylatable material, R is a radical derived from an alkaline oxide which can be ethylene and propylene and n is an integer from, for example, 10 to 2,000 or more and z is an integer determined by the number of reactive oxyalkylatable groups.

The conjugated polyoxyalkylene compounds described in U.S. Pat. No. 2,677,700, issued May 4, 1954 to Jackson et al. corresponding to the formula $Y(C_3H_6O)_n (C_2H_4O)_mH$ wherein Y is the residue of organic compound having from about 1 to 6 carbon atoms and one reactive hydrogen atom, n has an average value of at least about 6.4, as determined by hydroxyl number and m has a value such that the oxyethylene portion constitutes about 10% to about 90% by weight of the molecule.

The conjugated polyoxyalkylene compounds described in U.S. Pat. No. 2,674,619, issued Apr. 6, 1954 to Lundsted et al. having the formula $Y[(C_3H_6O_n(C_2H_4O)_mH]_x$ wherein Y is the residue of an organic compound having from about 2 to 6 carbon atoms and containing x reactive hydrogen atoms in which x has a value of at least about 2, n has a value such that the molecular weight of the polyoxypropylene hydrophobic base is at least about 900 and m has value such that the oxyethylene content of the molecule is from about 10% to about 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents which are advantageously used in the compositions of this invention correspond to the formula: $P[(C_3H_6O)_n(C_2H_4O)_mH]_x$ wherein P is the residue of an organic compound having from about 8 to 18 carbon atoms and containing x reactive hydrogen atoms in which x has a value of 1 or 2, n has a value such that the molecular weight of the polyoxyethylene portion is at least about 44 and m has a value such that the oxypropylene content of the molecule is from about 10% to about 90% by weight. In either case the oxypropylene chains may contain optionally, but advantageously, small amounts of ethylene oxide and the oxyethylene chains may contain also optionally, but advantageously, small amounts of propylene oxide.

8. Polyhydroxy fatty acid amide surfactants suitable for use in the present compositions include those having the structural formula $R_2CON_{R1}Z$ in which: R1 is H, $C_1$-$C_4$ hydrocarbyl, 2-hydroxy ethyl, 2-hydroxy propyl, ethoxy, propoxy group, or a mixture thereof; $R_2$ is a $C_5$-$C_{31}$ hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

9. The alkyl ethoxylate condensation products of aliphatic alcohols with from about 0 to about 25 moles of ethylene oxide are suitable for use in the present compositions. The alkyl chain of the aliphatic alcohol can either be straight or branched, primary or secondary, and generally contains from 6 to 22 carbon atoms.

10. The ethoxylated $C_6$-$C_{18}$ fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the $C_6$-$C_{18}$ ethoxylated fatty alcohols with a degree of ethoxylation of from 3 to 50.

11. Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from about 6 to about 30 carbon atoms and a polysaccharide, e.g., a polyglycoside, hydrophilic group containing from about 1.3 to about 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

12. Fatty acid amide surfactants suitable for use the present compositions include those having the formula: $R_6CON(R_7)_2$ in which $R_6$ is an alkyl group containing from 7 to 21 carbon atoms and each $R_7$ is independently hydrogen, $C_1$-$C_4$ alkyl, $C_1$-$C_4$ hydroxyalkyl, or $—(C_2H_4O)_xH$, where x is in the range of from 1 to 3.

13. A useful class of non-ionic surfactants include the class defined as alkoxylated amines or, most particularly, alcohol alkoxylated/aminated/alkoxylated surfactants. These non-ionic surfactants may be at least in part represented by the general formulae: $R^{20}—(PO)_SN\text{-}(EO)_tH$, $R^{20}—(PO)_SN\text{-}(EO)_tH(EO)_tH$, and $R^{20}—N(EO)_tH$; in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula: $R^{20}—(PO)_v—N[(EO)_wH][(EO)_zH]$ in which $R^{20}$ is as defined above, v is 1 to 20 (e.g., 1, 2, 3, or 4 (preferably 2)), and w and z are independently 1-10, preferably 2-5. These compounds are represented commercially by a line of products sold by Huntsman Chemicals as nonionic surfactants. A preferred chemical of this class includes Surfonic™ PEA 25 Amine Alkoxylate. Preferred nonionic surfactants for the compositions of the invention include alcohol alkoxylates, EO/PO block copolymers, alkylphenol alkoxylates, and the like.

The treatise *Nonionic Surfactants*, edited by Schick, M. J., Vol. 1 of the Surfactant Science Series, Marcel Dekker, Inc., New York, 1983 is an excellent reference on the wide variety of nonionic compounds generally employed in the practice of the present invention. A typical listing of nonionic classes, and species of these surfactants, is given in U.S. Pat. No. 3,929,678 issued to Laughlin and Heuring on Dec. 30, 1975. Further examples are given in "Surface Active Agents and detergents" (Vol. I and II by Schwartz, Perry and Berch).

In some embodiments, the compositions of the present invention include about 0.001 wt-% to about 25 wt-% of a surfactant. In other embodiments the compositions of the present invention include about 0.01 wt-% to about 5 wt-% of a surfactant. In still yet other embodiments, the compositions of the present invention include about 0.1 wt-% to about 1 wt-% of a surfactant.

Defoaming Agents

A defoaming agent for reducing the stability of foam may also be included in the compositions. Examples of defoaming agents include, but are not limited to: ethylene oxide/propylene block copolymers such as those available under the name Pluronic N-3; silicone compounds such as silica dispersed in polydimethylsiloxane, polydimethylsiloxane, and functionalized polydimethylsiloxane; fatty amides, hydrocarbon waxes, fatty acids, fatty esters, fatty alcohols, fatty acid soaps, ethoxylates, mineral oils, and polyethylene glycol esters. A discussion of defoaming agents may be found, for example, in U.S. Pat. Nos. 3,048,548, 3,334,147, and 3,442,242, the disclosures of which are incorporated herein by reference.

Chelants

In some embodiments, the compositions of the present invention can include a chelant or builder, in addition to the corrosion inhibitor. Builders or chelating agents (chelators) can also be referred to as sequestering agents (sequestrants), detergent builders, and the like. A chelant often stabilizes the composition or a use solution thereof. Preferred builders are water soluble.

Examples of builders include phosphonic acids and phosphonates, phosphates, condensed phosphates, aminocarboxylates and their derivatives, pyrophosphates, polyphosphates, ethylenediamene and ethylenetriamene derivatives, hydroxyacids, and mono-, di-, and tri-carboxylates and their corresponding acids. Other builders include aluminosilicates, nitroloacetates and their derivatives, and mixtures thereof. Still other builders include aminocarboxylates, including salts of ethylenediaminetetraacetic acid (EDTA), hydroxyethylenediaminetetraacetic acid (HEDTA), and diethylenetriaminepentaacetic acid, and alanine-N,N-diacetic acid; n-hydroxyethyliminodiacetic acid; and the like; their alkali metal salts; and mixtures thereof. Suitable aminophosphates include nitrilotrismethylene phosphates and other aminophosphates with alkyl or alkaline groups with less than 8 carbon atoms.

Exemplary polycarboxylates iminodisuccinic acids (IDS), sodium polyacrylates, citric acid, gluconic acid, oxalic acid, salts thereof, mixtures thereof, and the like. Additional polycarboxylates include citric or citrate-type chelating agents, polymeric polycarboxylate, and acrylic or polyacrylic acid-type chelating agents. Additional chelating agents include polyaspartic acid or co-condensates of aspartic acid with other amino acids, $C_4$-$C_{25}$-mono-or-dicarboxylic acids and $C_4$-$C_{25}$-mono-or-diamines. Exemplary polymeric polycarboxylates include polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, hydrolyzed acrylonitrile-methacrylonitrile copolymers, and the like.

Useful aminocarboxylic acid materials containing little or no NTA include, but are not limited to: N-hydroxyethylaminodiacetic acid, ethylenediaminetetraacetic acid (EDTA), hydroxyethylenediaminetetraacetic acid, diethylenetriaminepentaacetic acid, N-hydroxyethyl-ethylenediaminetriacetic acid (HEDTA), diethylenetriaminepentaacetic acid (DTPA), methylglycinediacetic acid (MGDA), glutamic acid-N,N-diacetic acid (GLDA), ethylenediaminesuccinic acid (EDDS), 2-hydroxyethyliminodiacetic acid (HEIDA), iminodisuccinic acid (IDS), 3-hydroxy-2-2'-iminodisuccinic acid (HIDS) and other similar acids or salts thereof having an amino group with a carboxylic acid substituent.

Oxidizing Agents and/or Compositions

According to the invention, the alkaline cleaning compositions of the present invention are suitable for combined use with oxidizing agents and/or compositions. Beneficially, and unexpectedly according to the invention, the alkaline cleaning compositions are catalyzed such that a catalyzing agent is available for the decomposition of oxidizing agents. According to an aspect of the invention, the alkaline cleaning compositions will not impact stability of the oxidizing agents and/or compositions. Accordingly, a broad variety of oxidizing agents may be catalyzed when used in combination with the alkaline cleaning compositions, even if the oxidizing compositions contain chlorine or other agents expected to present stability concerns.

Peroxycarboxylic Acids

In a preferred aspect, an oxidizing agent or an oxidizer may be a peroxide or peroxyacid. Peroxygen compounds, which include peroxides and various percarboxylic acids, including percarbonates, are suitable. In such an aspect, the catalyst of the alkaline cleaning composition promotes the decomposition of the oxidizing agent providing enhanced soil removal without having the expected staining and/or corrosion of the highly oxidizing conditions. In an aspect, the oxidizing agents (e.g. oxygen compounds) react with the soil, especially when combined with an alkaline source from the alkaline cleaning composition and creates vigorous mechanical action on and within the soil, which enhances removal of the soil beyond that caused by the chemical and bleaching action.

Peroxycarboxylic acid (i.e. peracid) are typically included in cleaning applications for antimicrobial and/or sanitizing efficacy. As used herein, the term "peracid" may also be referred to as a "percarboxylic acid," "peroxycarboxylic acid" or "peroxyacid." Sulfoperoxycarboxylic acids, sulfonated peracids and sulfonated peroxycarboxylic acids are also included within the terms "peroxycarboxylic acid" and "peracid" as used herein. The terms "sulfoperoxycarboxylic acid," "sulfonated peracid," or "sulfonated peroxycarboxylic acid" refers to the peroxycarboxylic acid form of a sulfonated carboxylic acid as disclosed in U.S. Pat. No. 8,344,026, and U.S. Patent Publication Nos. 2010/0048730 and 2012/0052134, each of which are incorporated herein by reference in their entirety. As one of skill in the art appreciates, a peracid refers to an acid having the hydrogen of the hydroxyl group in carboxylic acid replaced by a hydroxy group. Oxidizing peracids may also be referred to herein as peroxycarboxylic acids.

A peracid includes any compound of the formula $R—(COOOH)_n$ in which R can be hydrogen, alkyl, alkenyl, alkyne, acylic, alicyclic group, aryl, heteroaryl, or heterocyclic group, and n is 1, 2, or 3, and named by prefixing the parent acid with peroxy. Preferably R includes hydrogen, alkyl, or alkenyl. The terms "alkyl," "alkenyl," "alkyne," "acylic," "alicyclic group," "aryl," "heteroaryl," and "heterocyclic group" are as defined herein.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups). Preferably, a straight or branched saturated aliphatic hydrocarbon chain having from 1 to 22 carbon atoms, such as, for example, methyl, ethyl, propyl, isopropyl (1-methylethyl), butyl, tert-butyl(1,1-dimethylethyl), and the like.

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including hetero aromatic) groups.

The term "alkenyl" includes an unsaturated aliphatic hydrocarbon chain having from 2 to 12 carbon atoms, such as, for example, ethenyl, 1-propenyl, 2-propenyl, 1-butenyl, 2-methyl-1-propenyl, and the like. The alkyl or alkenyl can be terminally substituted with a heteroatom, such as, for example, a nitrogen, sulfur, or oxygen atom, forming an aminoalkyl, oxyalkyl, or thioalkyl, for example, aminomethyl, thioethyl, oxypropyl, and the like. Similarly, the above alkyl or alkenyl can be interrupted in the chain by a heteroatom forming an alkylaminoalkyl, alkylthioalkyl, or alkoxyalkyl, for example, methylaminoethyl, ethylthiopropyl, methoxymethyl, and the like.

Further, as used herein the term "alicyclic" includes any cyclic hydrocarbyl containing from 3 to 8 carbon atoms. Examples of suitable alicyclic groups include cyclopropanyl, cyclobutanyl, cyclopentanyl, etc. In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan. Additional examples of suitable heterocyclic groups include groups derived from tetrahydrofurans, furans, thiophenes, pyrrolidines, piperidines, pyridines, pyrrols, picoline, coumaline, etc.

According to the invention, alkyl, alkenyl, alicyclic groups, and heterocyclic groups can be unsubstituted or substituted by, for example, aryl, heteroaryl, $C_{1-4}$ alkyl, $C_{1-4}$ alkenyl, $C_{1-4}$ alkoxy, amino, carboxy, halo, nitro, cyano, —$SO_3H$, phosphono, or hydroxy. When alkyl, alkenyl, alicyclic group, or heterocyclic group is substituted, preferably the substitution is $C_{1-4}$ alkyl, halo, nitro, amido, hydroxy, carboxy, sulpho, or phosphono. In one embodiment, R includes alkyl substituted with hydroxy. The term "aryl" includes aromatic hydrocarbyl, including fused aromatic rings, such as, for example, phenyl and naphthyl. The term "heteroaryl" includes heterocyclic aromatic derivatives having at least one heteroatom such as, for example, nitrogen, oxygen, phosphorus, or sulfur, and includes, for example, furyl, pyrrolyl, thienyl, oxazolyl, pyridyl, imidazolyl, thiazolyl, isoxazolyl, pyrazolyl, isothiazolyl, etc. The term "heteroaryl" also includes fused rings in which at least one ring is aromatic, such as, for example, indolyl, purinyl, benzofuryl, etc.

According to the invention, aryl and heteroaryl groups can be unsubstituted or substituted on the ring by, for example, aryl, heteroaryl, alkyl, alkenyl, alkoxy, amino, carboxy, halo, nitro, cyano, —$SO_3H$, phosphono, or hydroxy. When aryl, aralkyl, or heteroaryl is substituted, preferably the substitution is $C_{1-4}$ alkyl, halo, nitro, amido, hydroxy, carboxy, sulpho, or phosphono. In one embodiment, R includes aryl substituted with $C_{1-4}$ alkyl.

Typical peroxygen compounds suitable for use as oxidizing agents include hydrogen peroxide ($H_2O_2$), peracetic acid, peroctanoic acid, a persulphate, a perborate, or a percarbonate. Some peroxycarboxylic acids include peroxypentanoic, peroxyhexanoic, peroxyheptanoic, peroxyoctanoic, peroxynonanoic, peroxyisononanoic, peroxydecanoic, peroxyundecanoic, peroxydodecanoic, peroxyascorbic, peroxyadipic, peroxycitric, peroxypimelic, or peroxysuberic acid, mixtures thereof, or the like. Some suitable branched chain peroxycarboxylic acid include peroxyisopentanoic, peroxyisononanoic, peroxyisohexanoic, peroxyisoheptanoic, peroxyisooctanoic, peroxyisonananoic, peroxyisodecanoic, peroxyisoundecanoic, peroxyisododecanoic, peroxyneopentanoic, peroxyneohexanoic, peroxyneoheptanoic, peroxyneooctanoic, peroxyneononanoic, peroxyneodecanoic, peroxyneoundecanoic, peroxyneododecanoic, mixtures thereof, or the like.

In another embodiment, a sulfoperoxycarboxylic acid has the following formula:

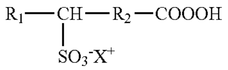

wherein $R_1$ is hydrogen, or a substituted or unsubstituted alkyl group; $R_2$ is a substituted or unsubstituted alkylene group; X is hydrogen, a cationic group, or an ester forming moiety; or salts or esters thereof. In some embodiments, $R_1$ is a substituted or unsubstituted $C_m$ alkyl group; X is hydrogen a cationic group, or an ester forming moiety; $R_2$ is a substituted or unsubstituted $C_n$ alkyl group; m=1 to 10; n=1 to 10; and m+n is less than 18, or salts, esters or mixtures thereof.

In some embodiments, $R_1$ is hydrogen. In other embodiments, $R_1$ is a substituted or unsubstituted alkyl group. In some embodiments, $R_1$ is a substituted or unsubstituted alkyl group that does not include a cyclic alkyl group. In some embodiments, $R_1$ is a substituted alkyl group. In some embodiments, $R_1$ is an unsubstituted $C_1$-$C_9$ alkyl group. In some embodiments, $R_1$ is an unsubstituted $C_7$ or $C_8$ alkyl. In other embodiments, $R_1$ is a substituted $C_8$-$C_{10}$ alkylene group. In some embodiments, $R_1$ is a substituted $C_8$-$C_{10}$ alkyl group is substituted with at least 1, or at least 2 hydroxyl groups. In still yet other embodiments, $R_1$ is a substituted $C_1$-$C_9$ alkyl group. In some embodiments, $R_1$ is a substituted $C_1$-$C_9$ substituted alkyl group is substituted with at least 1 $SO_3H$ group. In other embodiments, $R_1$ is a $C_9$-$C_{10}$ substituted alkyl group. In some embodiments, $R_1$ is a substituted $C_9$-$C_{10}$ alkyl group wherein at least two of the carbons on the carbon backbone form a heterocyclic group. In some embodiments, the heterocyclic group is an epoxide group.

In some embodiments, $R_2$ is a substituted $C_1$-$C_{10}$ alkylene group. In some embodiments, $R_2$ is a substituted $C_8$-$C_{10}$ alkylene. In some embodiments, $R_2$ is an unsubstituted $C_6$-$C_9$ alkylene. In other embodiments, $R_2$ is a $C_8$-$C_{10}$ alkylene group substituted with at least one hydroxyl group. In some embodiments, $R_2$ is a $C_{10}$ alkylene group substituted with at least two hydroxyl groups. In other embodiments, $R_2$ is a $C_8$ alkylene group substituted with at least one $SO_3H$ group. In some embodiments, $R_2$ is a substituted $C_9$ group, wherein at least two of the carbons on the carbon backbone form a heterocyclic group. In some embodiments, the heterocyclic group is an epoxide group. In some embodiments, $R_1$ is a $C_8$-$C_9$ substituted or unsubstituted alkyl, and $R_2$ is a $C_7$-$C_8$ substituted or unsubstituted alkylene.

These and other suitable sulfoperoxycarboxylic acid compounds for use in the stabilized peroxycarboxylic acid compositions of the invention are further disclosed in U.S. Pat. No. 8,344,026 and U.S. Patent Publication Nos. 2010/0048730 and 2012/0052134, which are incorporated herein by reference in its entirety.

In an aspect, the oxidizing agent can be used at any suitable concentration. In some embodiments, the oxidizing agent such as the peracid or hydrogen peroxide has a concentration from about 0.1 wt-% to about 50 wt-%, or from about 0.1 wt-% to about 40 wt-% in a concentrated equilibrium composition. In another aspect, the peracid oxidizing agent has a concentration in a use solution of the composition according to the invention from about 0 ppm to about 5000 ppm, from about 0 to about 4500 ppm, from about 1 to about 4500 ppm, or from about 100 ppm to about 4000 ppm. Without limiting the scope of invention, the numeric ranges are inclusive of the numbers defining the range and include each integer within the defined range.

Hydrogen Peroxide

In a preferred aspect, an oxidizing agent or an oxidizer may be hydrogen peroxide. Hydrogen peroxide, $H_2O_2$, provides the advantages of having a high ratio of active oxygen because of its low molecular weight (34.014 g/mole) and being compatible with numerous substances that can be treated by methods of the invention because it is a weakly acidic, clear, and colorless liquid. Another advantage of hydrogen peroxide is that it decomposes into water and oxygen. It is advantageous to have these decomposition products because they are generally compatible with substances being treated. For example, the decomposition products are generally compatible with metallic substance (e.g., substantially noncorrosive) and are generally innocuous to incidental contact and are environmentally friendly.

The hydrogen peroxide can be used at any suitable concentration. In some embodiments, a concentrated equilibrium composition has a concentration of hydrogen peroxide from about 0.5 wt-% to about 90 wt-%, or from about 1 wt-% to about 90 wt-%. In still other embodiments, the hydrogen peroxide has a concentration from about 1 wt-% to about 80 wt-%, from about 1 wt-% to about 50 wt-%. In another aspect, the hydrogen peroxide oxidizing agent has a concentration in a use solution of the composition according to the invention from about 0 ppm to about 5000 ppm, from about 0 to about 4500 ppm, from about 1 to about 4500 ppm, or from about 100 ppm to about 4000 ppm. Without limiting the scope of invention, the numeric ranges are inclusive of the numbers defining the range and include each integer within the defined range.

Oxidizing Boosters

Suitable oxidants can also be provided in the form of a booster, which may include for example oxidants such as chlorites, bromine, bromates, bromine monochloride, iodine, iodine monochloride, iodates, permanganates, nitrates, nitric acid, borates, perborates, and gaseous oxidants such as ozone, oxygen, chlorine dioxide, chlorine, sulfur dioxide and derivatives thereof. In an aspect, such oxidants may be employed as a booster, alone or in combination with the oxidizing agent, such as a chlorine booster. Beneficially, the alkaline cleaning compositions according to the invention do not interfere with the stability of chlorine and/or other boosters.

An oxidizer may include bleaching compounds capable of liberating an active halogen species, such as $Cl_2$, $Br_2$, —OCl and/or —OBr, under conditions typically encountered during the cleansing process. Suitable bleaching agents for use in the present detergent compositions include, for example, chlorine-containing compounds such as a chlorine, a hypochlorite (e.g. sodium hypochlorite), and/or chloramine. Preferred halogen-releasing compounds include the alkali metal dichloroisocyanurates, such as sodium dichloroisocyanurate, chlorinated trisodium phosphate, the alkali metal hypochlorites, monochlorarrine and dichloramine, and the like.

Methods of Use

The alkaline cleaning compositions of the invention can be used as a catalytic and stain inhibition package for use alone or with a high alkaline and/or oxidizing cleaning composition. These would include applications of use including, for example, CIP cleaners, dish machine cleaners and laundry cleaners. The alkaline cleaning compositions of the invention are also suitable for use in any process for cleaning surfaces, including but not limited to the stainless steel surfaces mentioned above. Cleaning metal surfaces which need non-staining, non-corrosive cleaning compositions is applicable to numerous applications, including for example CIP applications and de-liming surfaces such as where the cleaner is passed through the pipes. Other examples include vehicle cleaning applications. Yet other examples include institutional water storage articles such as ice machines which need to be de-limed, in fact the compositions may be used in any situation where a surface needs to be cleaned due to hard water residue. The alkaline cleaning compositions of the invention may even find use in other industries such as textile processing, paper manufacturing and the like. In an aspect, the alkaline cleaning compositions when combined with oxidizing compositions provide beneficial cleaning and/or sanitizing. In some aspects, an oxidizing composition can be employed as a pre-treatment followed by the alkaline cleaning composition as an override. In additional aspects, the oxidizing composition is combined at any point during the application and/or use of the alkaline cleaning composition.

In a preferred aspect, it has been discovered that food and beverage soils, and especially baked-on food and beverage soils can be removed from surfaces using the alkaline cleaning compositions, optionally in combination with a sanitizing oxidant composition. The invention relates to methods of cleaning equipment such as heat exchangers, evaporators, tanks and other industrial equipment using clean-in-place procedures. The method is suitable for organic soil removal or, more particularly, for food or beverage soil removal. Further, the method relates to cleaning processes for removing carbohydrate and proteinaceous soils from food and beverage manufacturing locations using a CIP method.

The methods for cleaning equipment using CIP cleaning procedures includes for example, such equipment as evaporators, heat exchangers (including tube-in-tube exchangers, direct steam injection, and plate-in-frame exchangers), heating coils (including steam, flame or heat transfer fluid heated) re-crystallizers, pan crystallizers, spray dryers, drum dryers, and tanks. The methods can be used in generally any applications where caked on soil or burned on soil, such as proteins or carbohydrates, needs to be removed; applications include the food and beverage industry (especially dairy), brewing, oil processing, industrial agriculture and ethanol processing.

CIP cleaning techniques are a specific cleaning regimen adapted for removing soils from the internal components of tanks, lines, pumps and other process equipment. CIP cleaning involves passing cleaning solutions through the system without dismantling any system components. The minimum CIP technique involves passing the cleaning solution through the equipment and then resuming normal processing. Any product contaminated by cleaner residue can be discarded. Often CIP methods involve a first rinse, the application of the cleaning solutions, a second rinse with potable water followed by resumed operations. The process can also include any other contacting step in which a rinse, acidic or basic functional fluid, solvent or other cleaning component such as hot water, cold water, etc. can be contacted with the equipment at any step during the process. Often the final potable water rinse is skipped in order to prevent contamination of the equipment with bacteria following the cleaning and/or sanitizing step.

The CIP process applies a dilute or use solution of the alkaline cleaning composition and optionally an oxidizing composition. The solutions to be applied typically flow across the surface (typically about 3 to 6 feet/second), slowly removing the soil. Either new solution is re-applied to the surface, or the same solution is recirculated and re-applied to the surface.

In an embodiment, the present method employing the catalyzed highly alkaline cleaning compositions can include applying the alkaline compositions to a soiled object. For example, the composition can be introduced into pipes or vessels in a plant, such as a food processing plant. The pipes or vessels can be subjected to CIP. Upon applying, the composition can be allowed to contact the soiled object for a predetermined amount of time. The amount of time can be sufficient to allow the composition to penetrate soil. The method can include penetrating the soil with the composition. Preferably, the methods include combining the catalyzed highly alkaline cleaning compositions with a sanitizing composition comprising an oxidizing agent. The combined alkalinity and oxidizing provides efficacious cleaning and/or sanitizing. The strength of the alkaline and/or oxidizing solutions and the duration of the cleaning steps are typically dependent on the durability of the soil.

In an aspect of the invention, the CIP methods include an apparatus or system in need of cleaning, such as a tank. In an aspect, a feed line supplies the alkaline cleaning composition according to the invention to the tank, and a drain line removes the solution from tank. Additional feed lines and tanks may be employed for the combined use of the oxidizing agent and/or compositions. Water or other diluent source may also have feed lines and tanks for dosing the use solutions according to the invention. A system or apparatus may further have operably connected pipes, valves, pumps, etc. equipment for the CIP process. A CIP process may further include a tank for retaining the alkaline cleaning compositions chemistry. A drain line from the tank is used to recirculate solution from tank back to CIP process and tank.

Beneficially, according to the invention, the use of the catalyzed highly alkaline cleaning compositions does not stain or corrode the surfaces to be treated. As referred to herein, corrosion is the degradative electrochemical reaction of a metal with its environment. A further beneficial aspect of the invention is that the combined use of the catalyzed highly alkaline cleaning compositions with an oxidizing agent and/or composition does not stain or corrode the surfaces to be treated in the liquid phase (i.e. surfaces contacted by the solutions), despite the highly alkaline and oxidizing conditions. Moreover, both the treatment and the storage of such compositions, including the catalyzed highly alkaline cleaning compositions do not result in any staining or corroding of the surfaces to be treated contacted by the vapor phase of the compositions.

Beneficially, the corrosion inhibitors employed according to the compositions protect metal surfaces from oxygen, moisture and other atmospheric pollutants from corrosion. In an aspect, the methods and compositions of the invention provide liquid and vapor protection for surfaces from corrosion for at least about 6 months, at least about 7 months, at least about 8 months, at least about 9 months, at least about 10 months, at least about 11 months, or at least about 12 months.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the present invention are further defined in the following non-limiting examples. It should be understood that these examples, while indicating certain embodiments of the invention, are given by way of illustration only. From the above discussion and the examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

Peroxide degradation was evaluated in a commercially-available highly alkaline caustic detergent composition (Control) in comparison to EXP formulations according to the invention. The Control and EXP 1 formulations are shown in Table 2. A use solution of EXP 1 contains about 5 ppm iron sulfate catalyst to promote the decomposition of hydrogen peroxide when provided in a use solution with the test compositions to measure rate of peroxide decomposition. The actives of alkalinity were equivalent at use solutions.

TABLE 2

| | Control | EXP 1 |
|---|---|---|
| NaOH (50%) | 80-99 | 90-99 |
| Gluconic Acid (50%) | <1 | 2-10 |
| Ferric Sulfate ($Fe_2(SO_4)_3$) | 0 | 0.01-1 |
| Water | 0.1-10 | 0.1-10 |
| Total | 100 | 100 |

The test compositions of Table 2 were each combined into a use solution containing 1400 ppm peroxide, provided in the form of a commercially-available booster composition containing hydrogen peroxide, alcohols and benzenesulfonic acid (Stabicip Oxi, available from Ecolab Inc.). Although staining was not evaluated in this example, the test compositions are expected to cause surface staining when cleaning in the presence of an oxidizing such as hydrogen peroxide. Therefore, the rates of peroxide decomposition to improve cleaning were first evaluated before staining prevention was tested.

Figure 2:
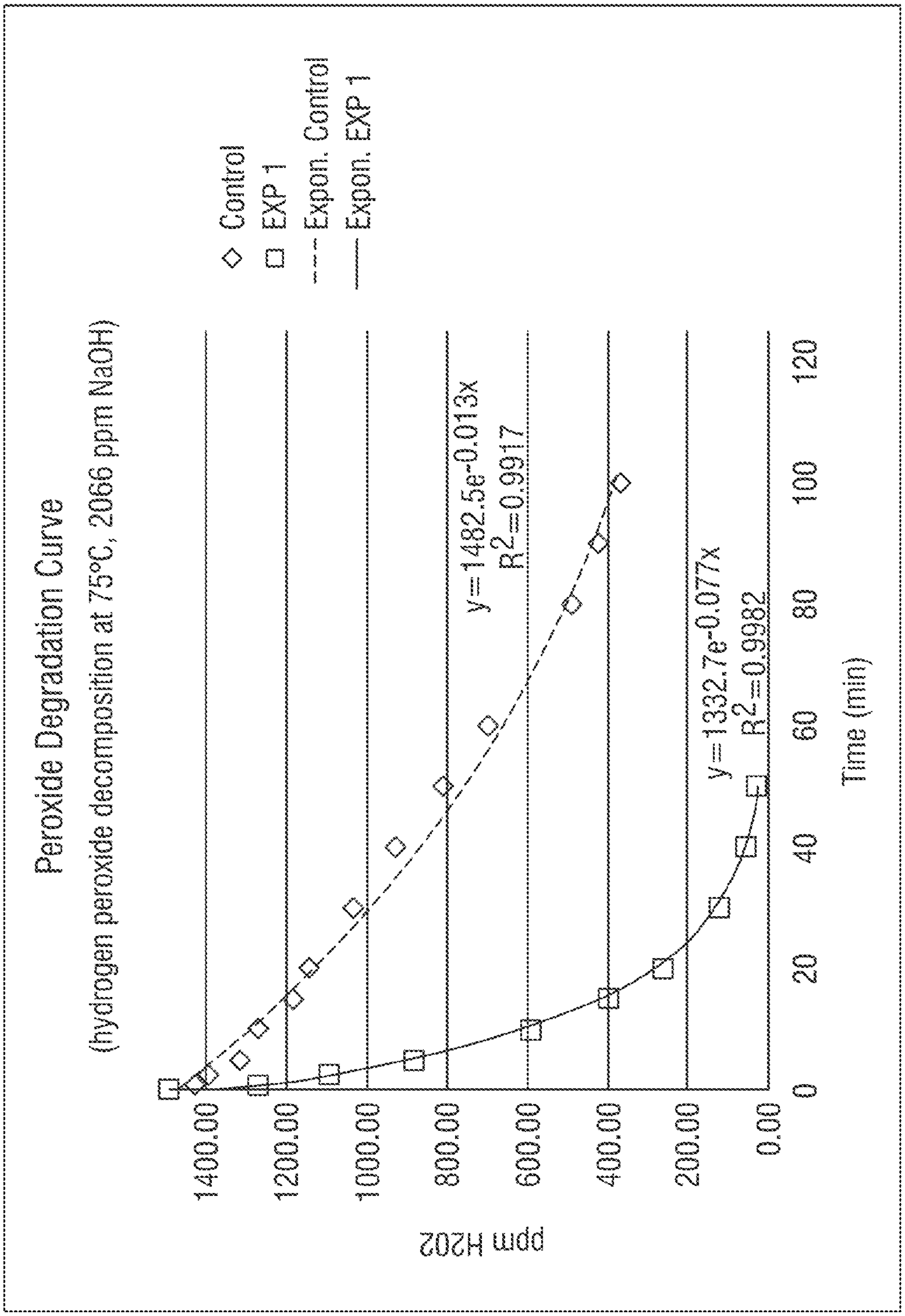
FIG. 2 shows a peroxide degradation curve comparing hydrogen peroxide decomposition in a less concentrated alkaline control and test formulation in comparison to FIG. 1 showing degradation according to an embodiment of the invention, wherein increased hydrogen peroxide decomposition results in increased bubbling of a cleaning composition and therefore cleaning performance.
Figure 3:
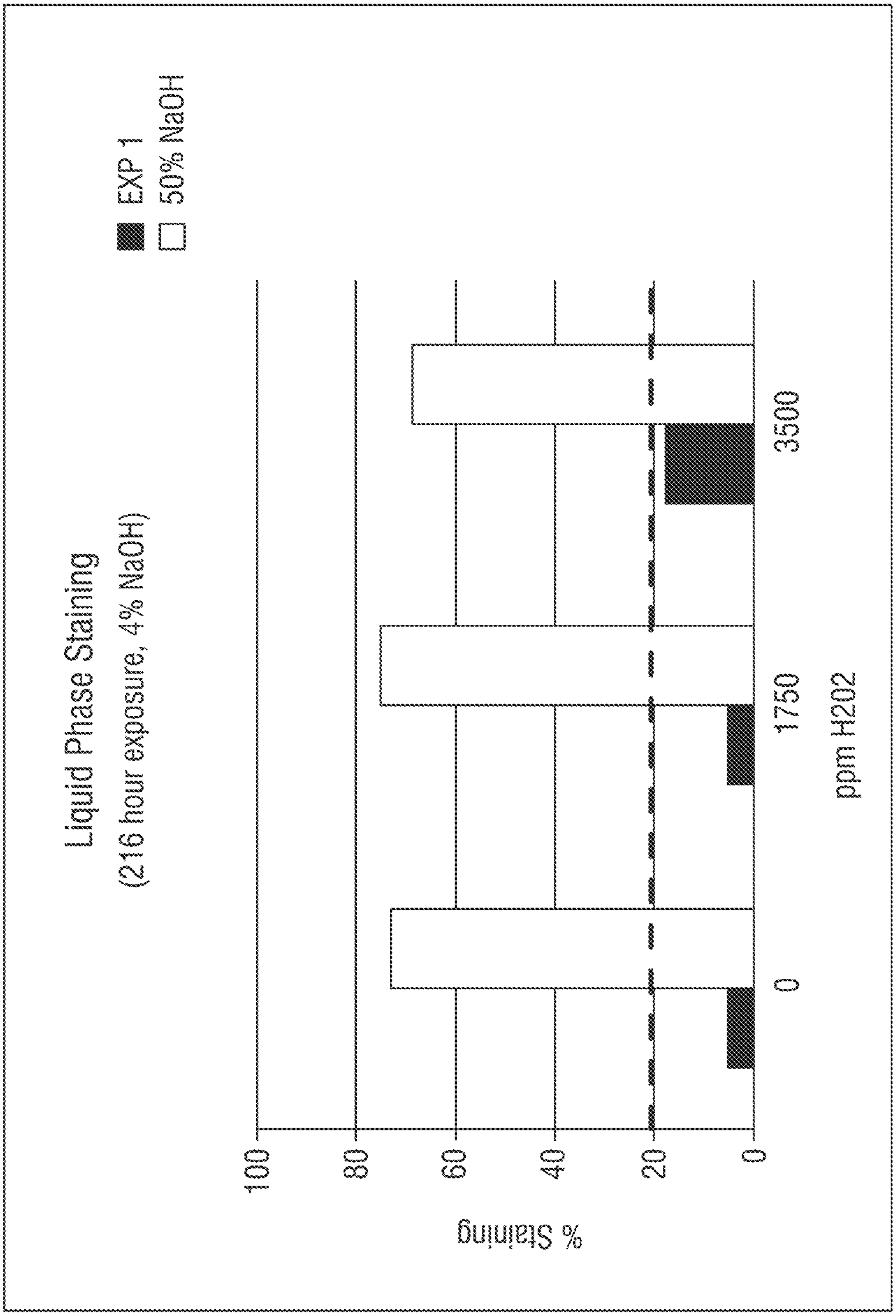
FIGS. 3 and 4 show graphs of liquid phase staining after 9 day exposure to alkaline compositions at varying concentrations showing Control (50% NaOH) compositions compared to compositions according to the invention.
Figure 4:
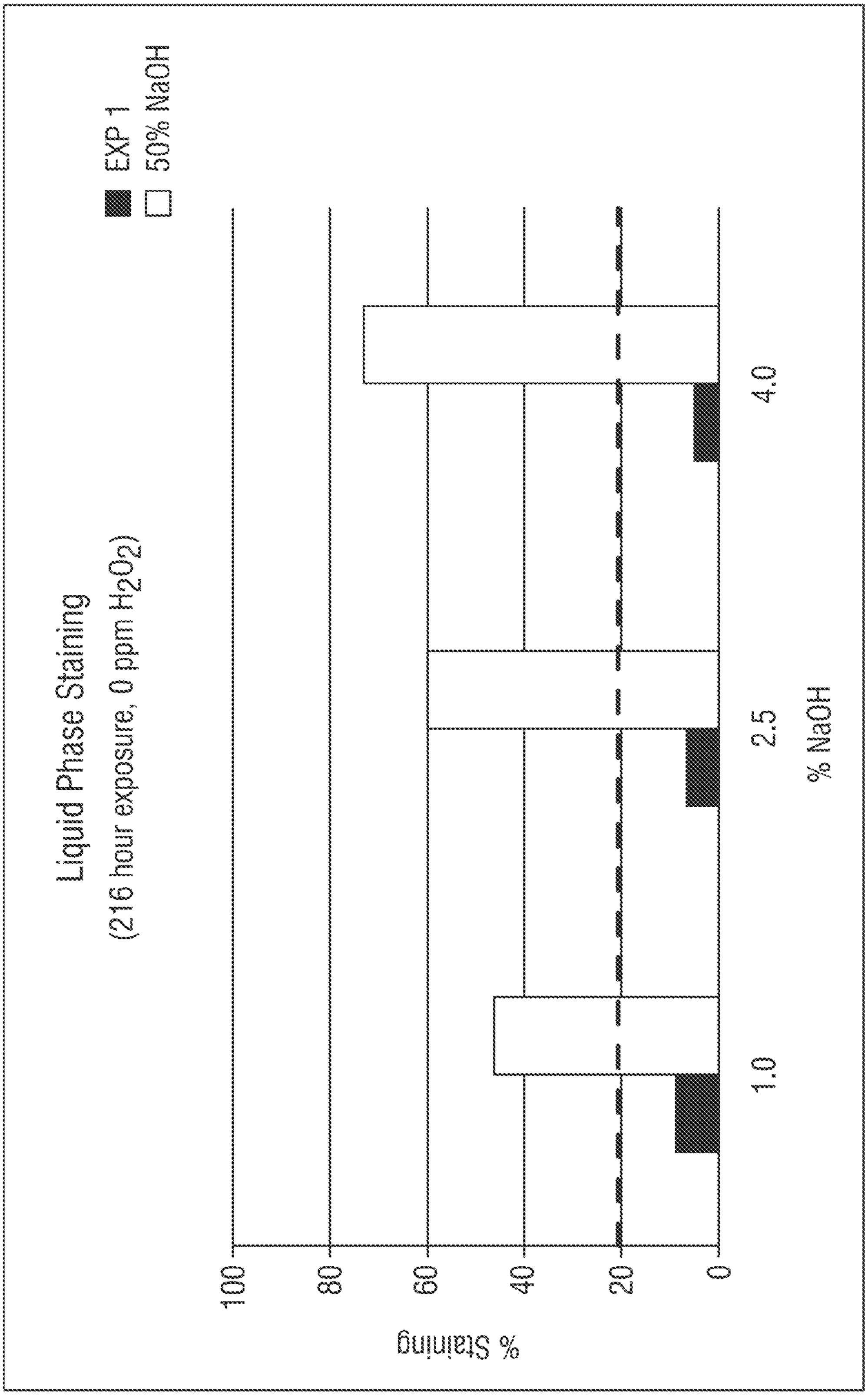
Figure 5:
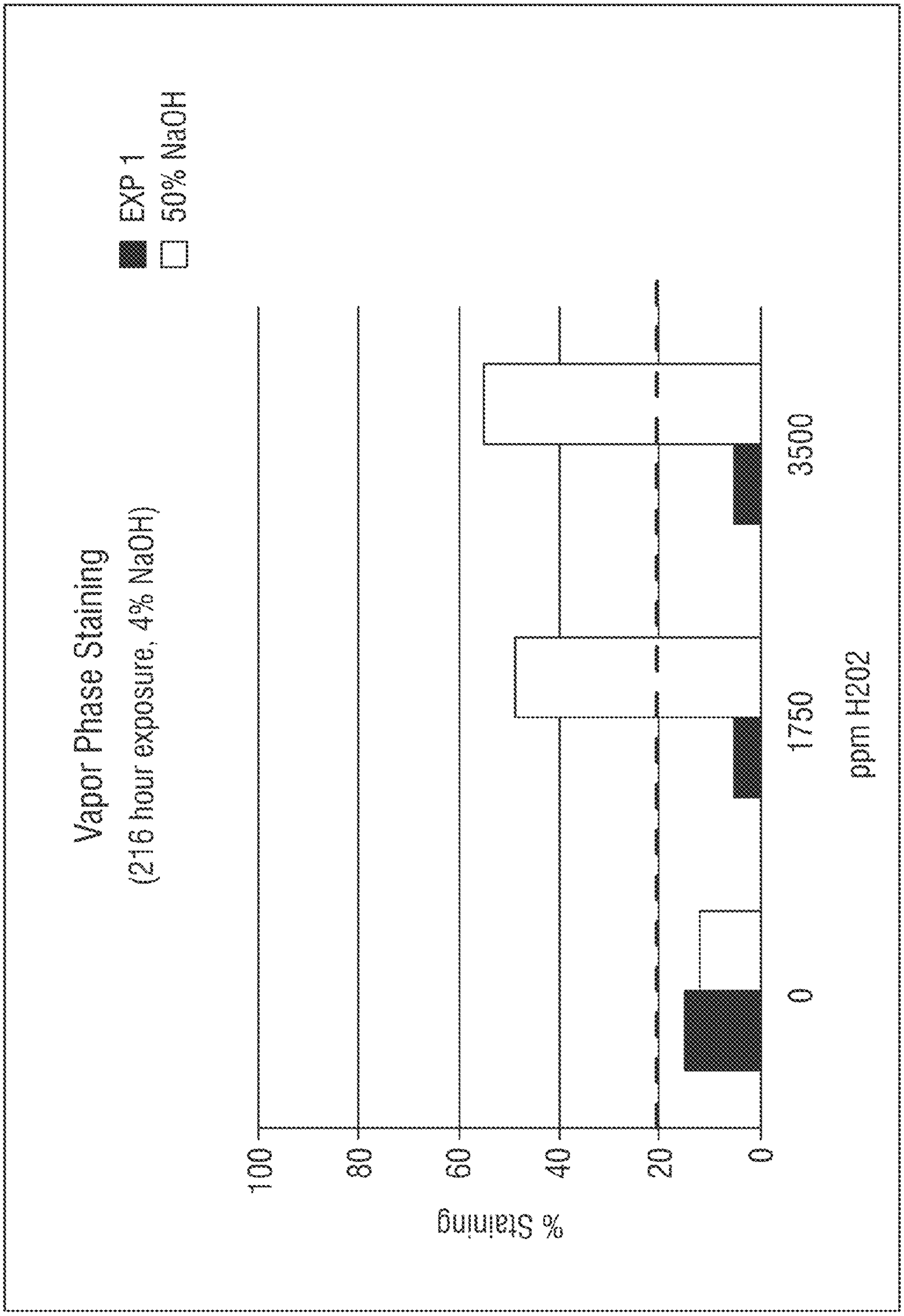
FIGS. 5 and 6 show graphs of vapor phase staining after 9 day exposure to alkaline compositions at varying concentrations showing Control (50% NaOH) compositions compared to compositions according to the invention.
Figure 6:
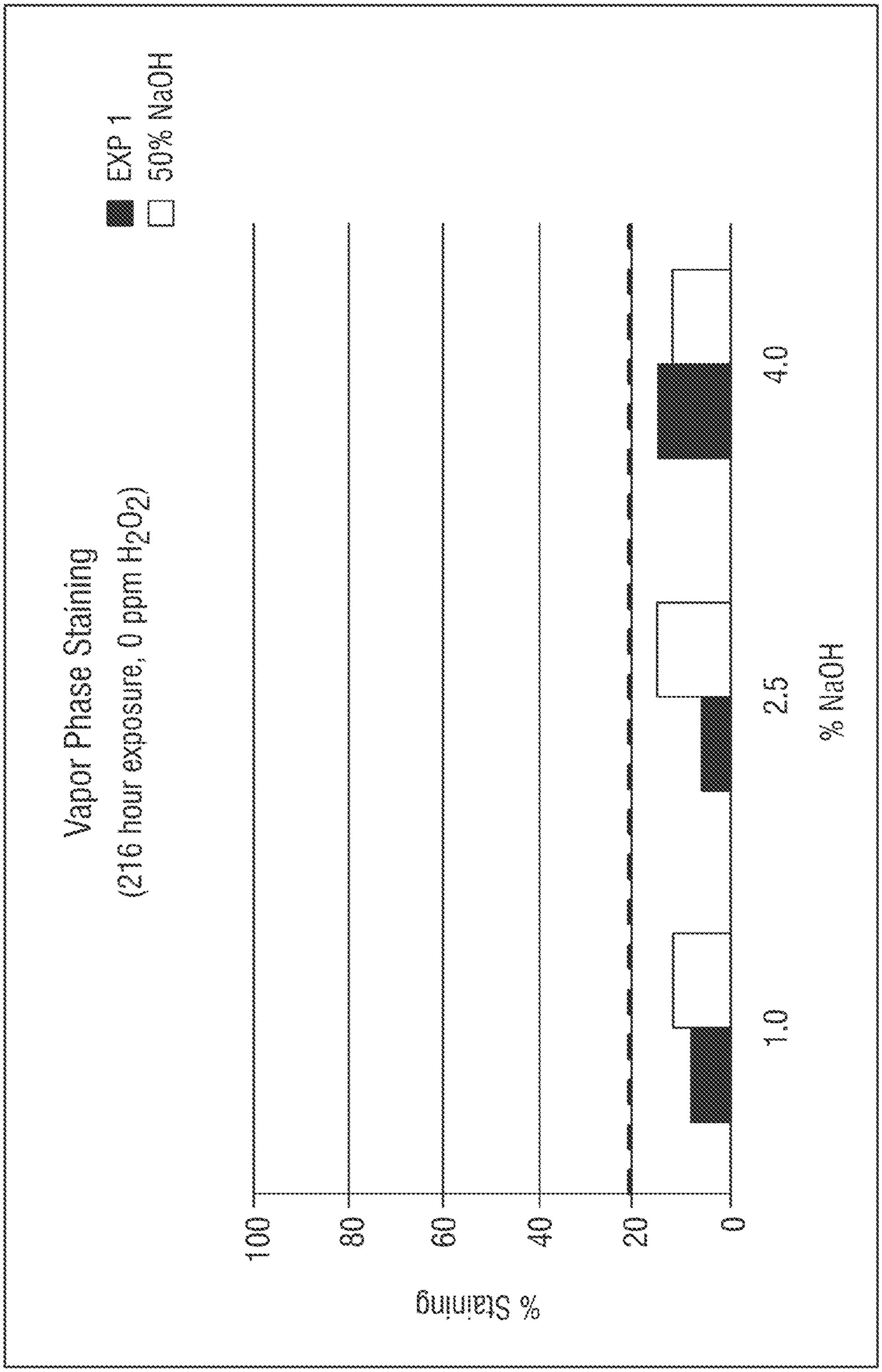
Figure 7:
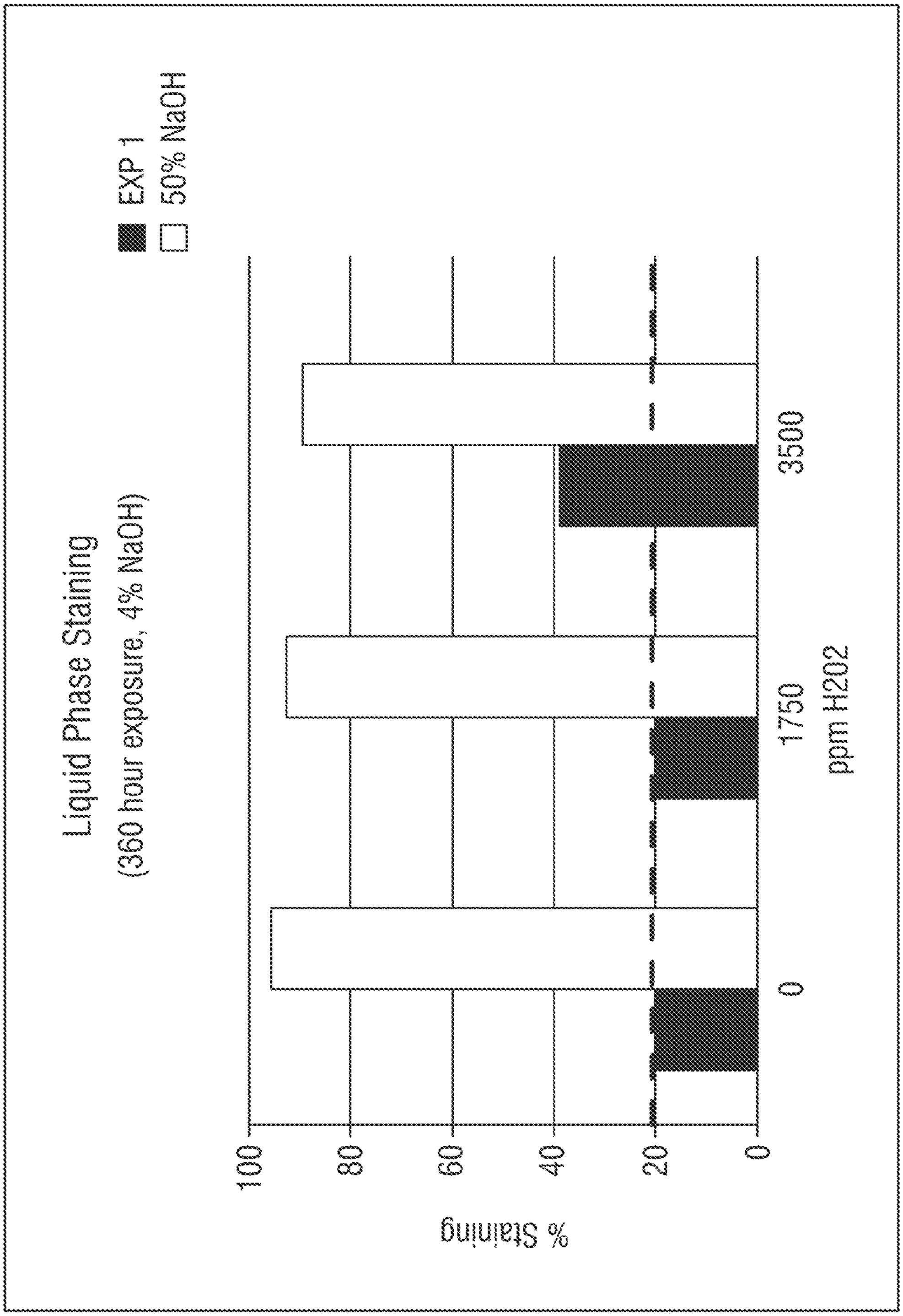
FIGS. 7 and 8 show graphs of liquid phase staining after 15 day exposure to alkaline compositions at varying concentrations showing Control (50% NaOH) compositions compared to compositions according to the invention.
Figure 8:
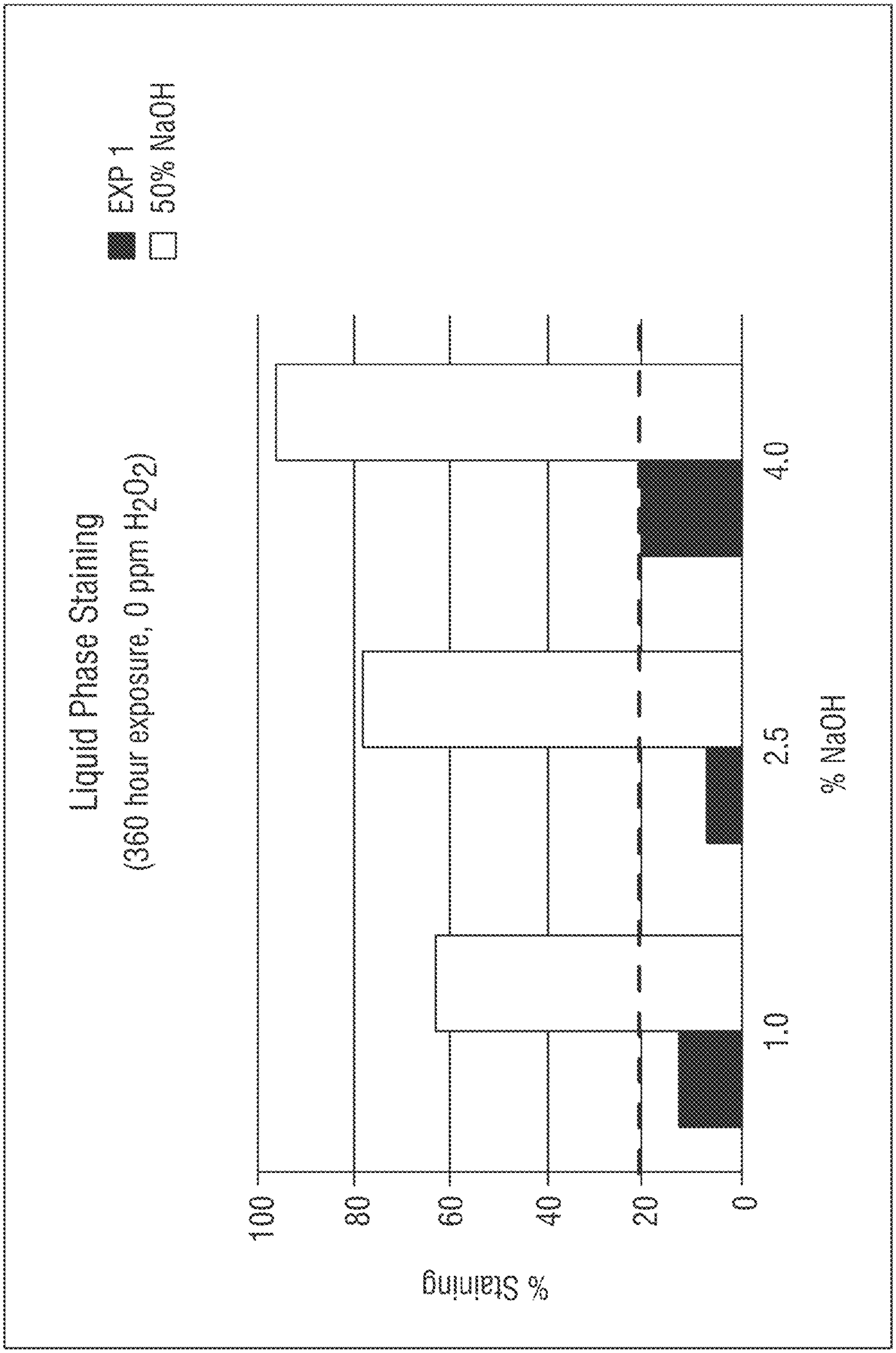
Figure 9:
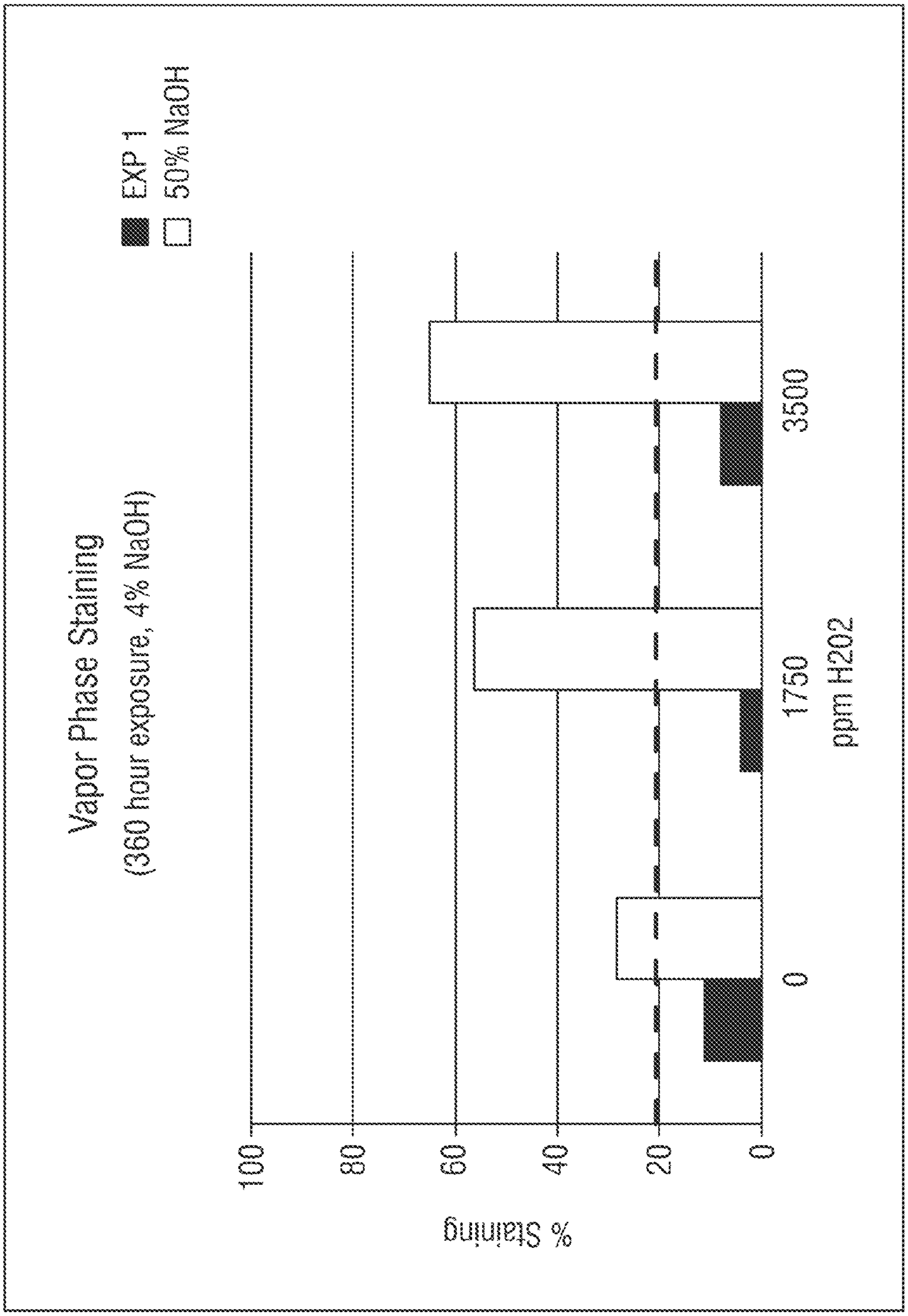
FIGS. 9 and 10 show graphs of vapor phase staining after 15 day exposure to alkaline compositions at varying concentrations showing Control (50% NaOH) compositions compared to compositions according to the invention.
Figure 10:
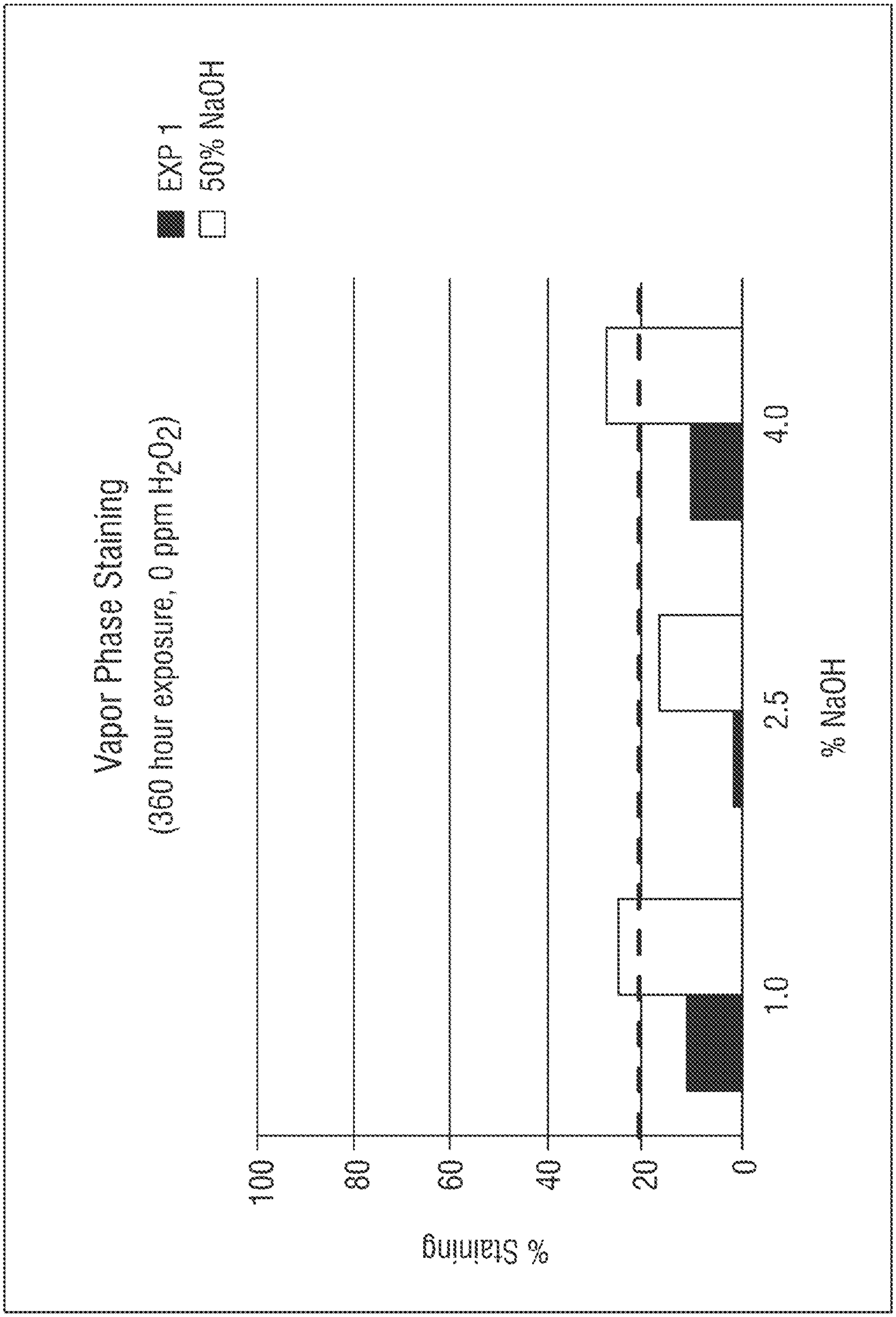

The results are shown in FIGS. 1-2 showing peroxide degradation curves of the Control and EXP 1 formulations at 75° C. in high concentration (1% NaOH—FIG. 1) and low concentration (2066 ppm—FIG. 2) cleaning compositions. The addition of iron sulfate catalyst in EXP 1 according to the invention reduces the half-life of hydrogen peroxide from 38 minutes (Control) down to 4 minutes (EXP 1) as shown in FIG. 1. Similarly, at low NaOH concentrations that half-life of the hydrogen peroxide is similarly significantly reduced from 60 minutes (Control) down to approximately <10 minutes (EXP 1) as shown in FIG. 2. The results show an effective increase in the catalytic peroxide decomposition reaction by at least about 10×, as compared to the Control formulation.

The increased hydrogen peroxide degradation of EXP 1 also corresponded with increased bubbling of the cleaning composition, which is a further cleaning enhancement for compositions.

Example 2

Assessment of the impact of corrosion and/or staining inhibition in both liquid and vapor phases was conducted using the test formulations according to the invention. The experimental evaluation provides an accelerated testing (e.g.

9-15 days) which equates to approximately 1-2 years of CIP washing conditions which would customarily result in staining and/or corrosion.

Metal samples were prepared according to the following methods. Stainless steel panels (1×3×1/16 inch 304 stainless steel) were obtained and plastic backing was removed before cleaning. Panels were submersed in toluene inside a sonicating bath for at least 30 minutes. Panels were then removed and submersed into an acetone sonicating bath for 30 minutes. Panels were removed and rinsed with deionized (DI) water and left to air dry. Panels were then washed in a 6% sodium hydroxide solution (commercially-available NaOH and carboxylated alcohol alcoxylate solution) for 30 minutes at 150° F. Panels were removed from the solution and rinsed with DI water and should exhibit good sheeting properties. Panels were then left to air dry and stored in a dissicator until initiation of chemical soaking and stain testing.

Chemical soak and staining test employed the following methods. A 4% (w/w) active NaOH solution was prepared with the EXP 1 formulations and diluted with softened water. Oxidizing chemistry was added when necessary. Plastic containers were filled with 57 grams of each solution evaluated. Stenciled panels were introduced into the solutions to create a half submersed environment to provide a vapor phase and a liquid phase. Plastic containers were left with lids on inside a 80° C. oven for a total of 9 days. Each day the samples were removed and the chemistry replaced. After a 9 day (216 hours) exposure the samples were removed and rinsed with DI water and left to air dry. The vapor phase and liquid phase staining was quantified through image analysis.

The Control for the chemical soak and staining test was a commodity caustic solution (50% NaOH).

The staining quantification employed the following procedure using Fiji image analysis software. All treated panels were scanned after chemical exposure and a clean control panel that was not chemically exposed to the solutions was scanned. A vapor phase and liquid phase analysis area were selected and a grey scale histogram was run on the treated panels. The same analysis was run on the clean panel. The "stained" (liquid or vapor phase) areas is subtracted from the "clean" controlled areas and the results are shown in percent staining.

The results for staining quantification after 216 hours are shown in FIGS. 3-6. For FIGS. 3-6 a threshold of less than 20% staining provided the visual assessment of suitable staining and corrosion inhibition according to the formulations of the present invention. Notably, measurements of less than 20% are not visually detectable. The EXP 1 formulation provides staining and corrosion protecting on the stainless steel surfaces below the 20% threshold in both the liquid phase (FIG. 3 and FIG. 4) and the vapor phase (FIG. 5 and FIG. 6), regardless of increasing hydroxide concentration and/or caustic concentration.

The results for staining quantification after 360 hours are shown in FIGS. 7-10. The same threshold measurement for staining and corrosion inhibition of less than 20% was used as threshold measurement. At the extended exposure of 360 hours the EXP 1 formulation provided staining and corrosion, wherein measurements greater than 20% were only observed at the increased peroxide concentrations of 3500 ppm and caustic concentrations of 4%.

Figure 11:
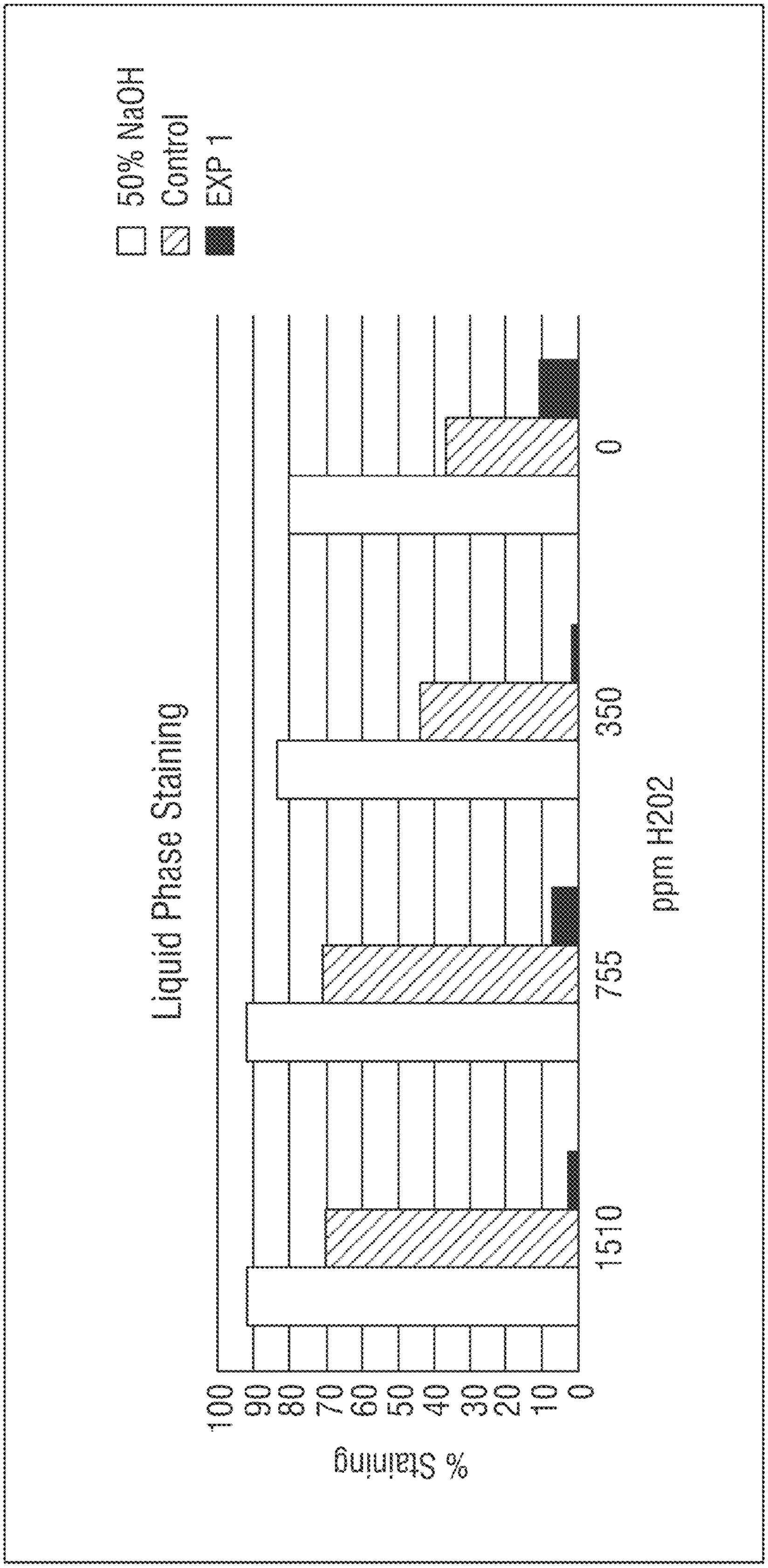
FIG. 11 shows a graph of liquid phase staining in Control (50% NaOH) compositions compared to compositions according to the invention having varying concentrations of remaining hydrogen peroxide with a peroxide additive.
Figure 12:
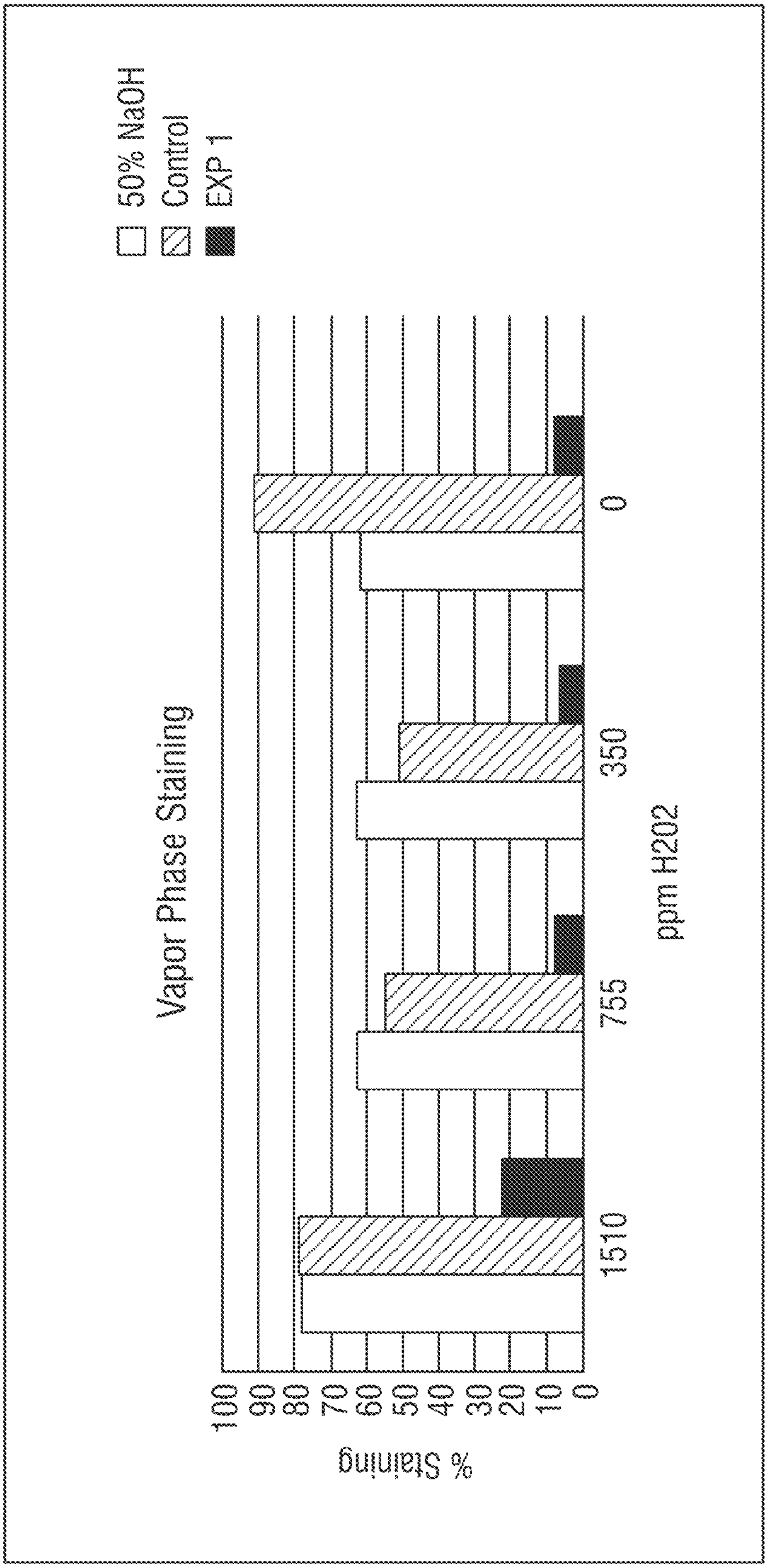
FIG. 12 shows a graph of vapor phase staining in Control (50% NaOH) compositions compared to compositions according to the invention having varying concentrations of remaining hydrogen peroxide with a peroxide additive.

The overall liquid phase staining (FIG. 11) and vapor phase staining (FIG. 12) of the various Controls in comparison to EXP 1 are shown illustrating the significant improvement in staining and corrosion reduction when the use of iron sulfate catalyst to enhance peroxide decomposition. Beneficially, the EXP 1 according to the invention show favorable results over commodity caustic for cleaning compositions, wherein EXP 1 provides staining and corrosion protection caused by caustic and peroxide on stainless steel surfaces.

Example 3

Figure 13:
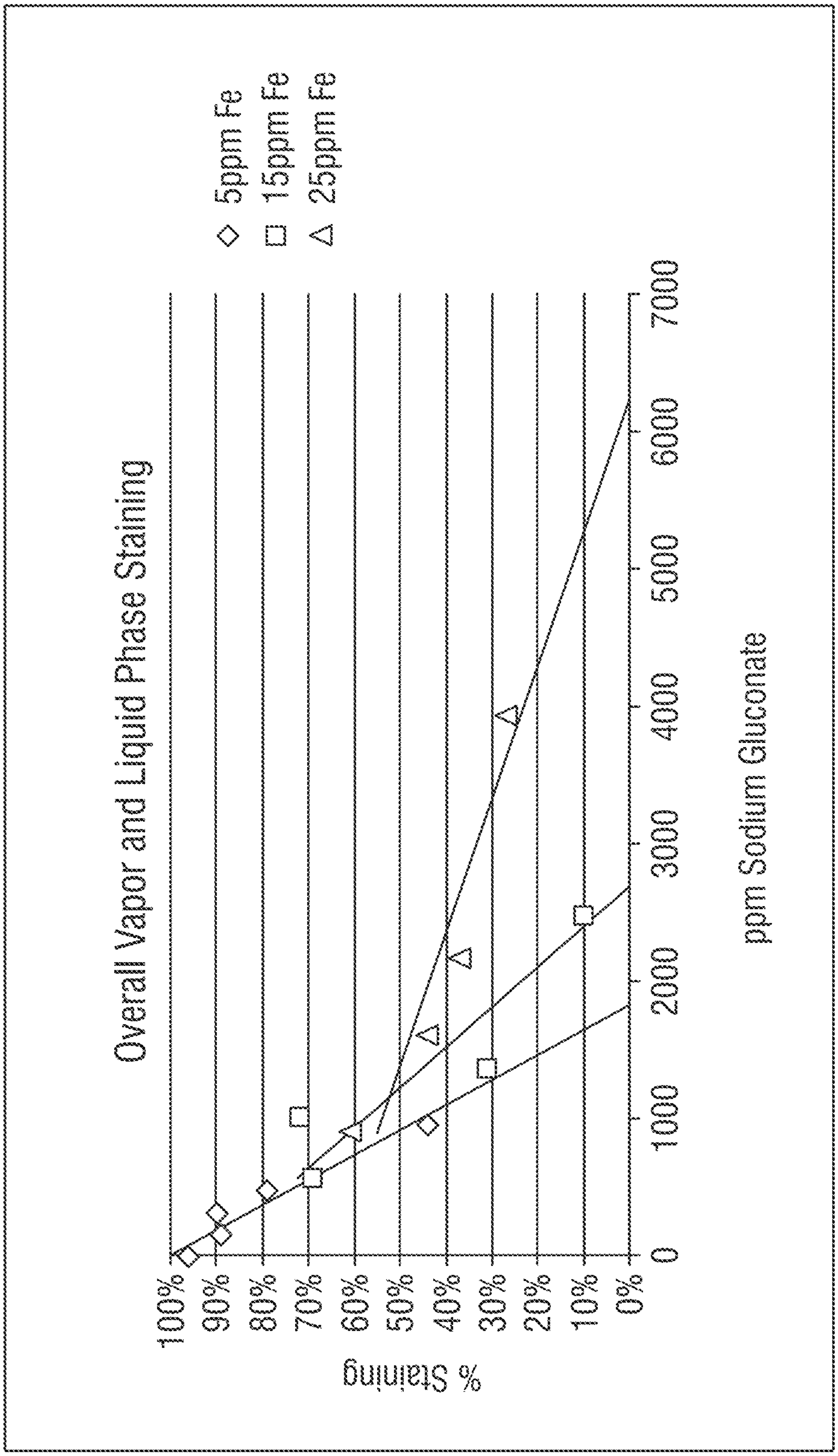
FIG. 13 shows the amount of gluconic acid needed to prevent staining under conditions that use different amounts of catalyst in solution.

Assessment of the impact of active catalyst (e.g. iron sulfate) on staining inhibition in both liquid and vapor phases was evaluated. FIG. 13 shows the effect of the iron sulfate on staining, including the amount of gluconic acid (gluconate) required to prevent the staining caused by the iron sulfate. The figure shows there is a significant reduction in percentage of staining with increased concentration of the catalyst and sodium gluconate.

For solutions with 5 ppm iron sulfate catalyst and 1500 ppm peroxide, as shown in FIG. 13, a use solution according to the invention employing an alkaline cleaning composition should provide approximately 2000 ppm gluconic acid (gluconate) to avoid both liquid and vapor phase staining. The alkaline cleaning compositions providing low concentrations (e.g. <1000 ppm gluconic acid (gluconate)) do not adequately reduce liquid phase staining. FIG. 13 shows that at 5 ppm catalyst approximately 2000 ppm gluconate should be included in the catalyzed highly alkaline cleaning composition; at 15 ppm catalyst approximately 3000 ppm gluconate should be included in the catalyzed highly alkaline cleaning composition; and at 25 ppm catalyst approximately 6000 ppm gluconate should be included in the catalyzed highly alkaline cleaning composition.

The inventions being thus described, it will be obvious that the same may be varied in many ways. Such variations are not to be regarded as a departure from the spirit and scope of the inventions and all such modifications are intended to be included within the scope of the following claims.

What is claimed is:

1. A method of cleaning soils from industrial equipment using a CIP process that does not stain and/or corrode metal surfaces in either liquid or vapor phases under highly alkaline and oxidizing conditions, the method comprising:

providing an alkaline cleaning composition to soils in industrial equipment, wherein the alkaline cleaning composition comprises from about 90 to 99 weight percent of an alkali metal hydroxide alkalinity source, from about 2 to 10 weight percent of gluconic acid or a salt thereof and glucaric acid or a salt thereof, from about 0.01 to 1 weight percent of an iron sulfate catalyst capable of decomposing an active oxygen source, and water, wherein a use solution of the alkaline cleaning composition has a pH of at least about 12;

providing an oxidizing composition o the soils in the industrial equipment, wherein the oxidizing composition comprises hydrogen peroxide, a peroxycarboxylic acid composition and/or percarbonates;

allowing the alkaline cleaning composition and oxidizing composition to remain on the soil for a period of time sufficient to facilitate soil removal;

circulating the alkaline cleaning composition and oxidizing composition through the equipment; and then rinsing the equipment.

2. The method of claim 1, wherein the alkaline cleaning composition is diluted at a point of use with a commodity alkalinity source and/or water to provide a use solution pH of at least about 13.

3. The method of claim 1, wherein the alkalinity source is sodium hydroxide.

4. The method of claim 1, wherein the equipment comprises pipes, vess or a combination thereof of heat transfer equipment.

5. The method of claim 1, wherein the industrial equipment is protected from corrosion for at least about 6 months.

6. A method of cleaning soils from industrial equipment using a CIP process that does not stain and/or corrode metal surfaces under highly alkaline and oxidizing conditions, the method comprising:

providing a concentrate alkaline cleaning composition to soils in industrial equipment, wherein the alkaline cleaning composition comprises from about 90 to 99 weight percent of an alkali metal hydroxide alkalinity source, from about 2 to 10 weight percent of gluconic acid or a salt thereof, from about 0.01 to 1 weight percent of a catalyst capable of decomposing an active oxygen source, wherein the catalyst is an iron metal and/or iron metal salt, and water;

allowing the alkaline cleaning composition to remain on the soil for a period of time sufficient to facilitate soil removal; and circulating the alkaline cleaning composition through the equipment.

7. The method of claim 6, wherein the equipment comprises pipes, vessels, or a combination thereof.

8. The method of claim 6, wherein the equipment comprises heat transfer equipment.

9. The method of claim 6, further comprising the step of generating a use solution of the alkaline cleaning composition having a pH of at least about 12.

10. The method of claim 9, further comprising the addition of a commodity source of alkalinity and/or water to generate the use solution.

11. The method of claim 9, wherein the concentrate alkaline cleaning composition comprises from about 90 to 95 weight percent alkalinity source wherein the alkalinity source is a sodium hydroxide, from about 5 to 10 weight percent gluconic acid or a salt thereof and glucaric acid or a salt thereof, from about 0.25 to 0.5 weight percent catalyst wherein the catalyst is iron sulfate, and wherein the use solution provides between about 2000 ppm alkalinity source to about 4 weight percent alkalinity source.

12. The method of claim 9, further comprising the addition of an oxidizing agent and/or an oxidizing composition comprising an oxidizer selected from the group consisting of hydrogen peroxide, peroxycarboxylic acid compounds, percarbonates and mixtures thereof.

13. The method of claim 12, wherein the equipment treated with the alkaline cleaning composition and oxidizing agent and/or an oxidizing composition does not stain and/or corrode in either liquid or vapor phases of the compositions.

14. A corrosion inhibiting and non-staining composition that does not stain and/or corrode metal surfaces under highly alkaline and oxidizing conditions comprising:

from about 90 to 99 weight percent of an alkali metal hydroxide alkalinity source, wherein the pH of a use solution of the composition is at least about 12;

from about 2 to 10 weight percent of at least one chelant, wherein the chelant is either a gluconic acid or a salt thereof or a combination of gluconic acid or a salt thereof and glucaric acid or a salt thereof;

from about 0.01 to 1 weight percent of a catalyst capable of decomposing an active oxygen source, wherein the catalyst is an iron metal and/or iron metal salt; and water.

15. The composition of claim 14, comprising from about 90 to 95 weight percent alkalinity source, from about 5 to 10 weight percent chelant, and from about 0.25 to 0.5 weight percent catalyst.

16. The composition of claim 14, comprising from about 90 to 99 weight percent alkalinity source, from about 2 to 10 weight percent chelant, and from about 0.1 to 1 weight percent catalyst.

17. The composition of claim 14, further comprising a nonionic surfactant and wherein the catalyst is iron sulfate, and wherein the chelant is a combination of gluconic acid or a salt thereof and glucaric acid or a salt thereof.

18. The composition of claim 14, wherein said composition is a premix formulation requiring combination with a commodity alkalinity source to generate a use solution having the pH of at least about 12.

19. The composition of claim 14, wherein a use solution provides between about 2000 ppm alkalinity source to about 4 weight percent alkalinity source, between about 100ppm to about 5000 ppm chelant, and between about 0.5 ppm to about 25 ppm catalyst.

20. The composition of claim 19, wherein the pH of the use solution of the composition is at least about 13.

* * * * *